(12) United States Patent
Iura et al.

(10) Patent No.: US 12,473,578 B2
(45) Date of Patent: Nov. 18, 2025

(54) CARBONYL REDUCTASE, NUCLEIC ACID ENCODING SAME, AND METHOD FOR PRODUCING OPTICALLY ACTIVE COMPOUND USING SAME

(71) Applicant: UBE CORPORATION, Yamaguchi (JP)

(72) Inventors: Takanobu Iura, Tokyo (JP); Yasumasa Dekishima, Tokyo (JP); Takeshi Sakamoto, Tokyo (JP); Mari Hara, Tokyo (JP); Hirotoshi Hiraoka, Osaka (JP); Harald Gröger, Bielefeld (DE); Jieun Choi, Berlin (DE)

(73) Assignee: UBE CORPORATION, Yamaguchi (JP)

( * ) Notice: Subject to any disclaimer, the term of this patent is extended or adjusted under 35 U.S.C. 154(b) by 545 days.

(21) Appl. No.: 17/778,712

(22) PCT Filed: Nov. 20, 2020

(86) PCT No.: PCT/JP2020/043366
§ 371 (c)(1),
(2) Date: May 20, 2022

(87) PCT Pub. No.: WO2021/100848
PCT Pub. Date: May 27, 2021

(65) Prior Publication Data
US 2023/0025343 A1 Jan. 26, 2023

(30) Foreign Application Priority Data
Nov. 22, 2019 (JP) .................................. 2019-211797

(51) Int. Cl.
C12P 17/16 (2006.01)
C12N 9/04 (2006.01)

(52) U.S. Cl.
CPC .......... *C12P 17/167* (2013.01); *C12N 9/0006* (2013.01); *C12Y 101/01184* (2013.01)

(58) Field of Classification Search
CPC .. C12P 17/167; C12P 7/18; C12P 7/42; C12P 7/62; C12P 17/10; C12N 9/0006; C12Y 101/01184
See application file for complete search history.

(56) References Cited

U.S. PATENT DOCUMENTS

| | | | | |
|---|---|---|---|---|
| 7,332,312 B2* | 2/2008 | Kizaki | ................. | C12N 9/0006 435/189 |
| 7,335,757 B2* | 2/2008 | Hiraoka | ................. | C12N 9/0006 530/370 |
| 7,794,993 B2* | 9/2010 | Kizaki | ................. | C12N 9/0006 435/189 |
| 2005/0048633 A1 | 3/2005 | Hiraoka et al. | | |
| 2008/0261281 A1 | 10/2008 | Kizaki et al. | | |
| 2016/0347718 A1 | 12/2016 | Watanabe et al. | | |
| 2017/0152488 A1 | 6/2017 | Hong et al. | | |
| 2018/0222865 A1 | 8/2018 | Watanabe et al. | | |

FOREIGN PATENT DOCUMENTS

| | | |
|---|---|---|
| EP | 2 562 253 A1 | 2/2013 |
| JP | 2003-339387 A | 12/2003 |
| JP | 4270918 B2 | 6/2009 |
| JP | 2017-518744 A | 7/2017 |
| WO | WO 2006/013801 A1 | 2/2006 |
| WO | WO 2011/132444 A1 | 10/2011 |
| WO | WO 2015/119261 A1 | 8/2015 |
| WO | WO 2017/022846 A1 | 2/2017 |

OTHER PUBLICATIONS

Banerjee et al., Improving enzymes for biomass conversion: A basic research perspective. Bioenerg. Res., 2010, vol. 3: 82-92. (Year: 2010).*
Broun et al., Catalytic plasticity of fatty acid modification enzymes underlying chemical diversity of plant lipids. Science, 1998, vol. 282: 1315-1317. (Year: 1998).*
Chica et al., Semi-rational approaches to engineering enzyme activity: combining the benefits of directed evolution and rational design. Curr. Opi. Biotechnol., 2005, vol. 16: 378-384. (Year: 2005).*
Devos et al., Practical limits of function prediction. Proteins: Structure, Function, and Genetics. 2000, vol. 41: 98-107. (Year: 2000).*
Seffernick et al., Melamine deaminase and Atrazine chlorohydrolase: 98 percent identical but functionally different. J. Bacteriol., 2001, vol. 183 (8): 2405-2410. (Year: 2001).*
Sen et al., Developments in directed evolution for enzyme functions. Appl. Biochem. Biotechnol., 2007, vol. 143: 212-223. (Year: 2007).*
Whisstock et al., Prediction of protein function from protein sequence. Q. Rev. Biophysics., 2003, vol. 36 (3): 307-340. (Year: 2003).*
Witkowski et al., Conversion of b-ketoacyl synthase to a Malonyl Decarboxylase by replacement of the active cysteine with glutamine. Biochemistry, 1999, vol. 38: 11643-11650. (Year: 1999).*
ISR for PCT/JP2020/043366, dated Jan. 19, 2021.
Written Opinion for PCT/JP2020/043366, dated Jan. 19, 2021 (w/ translation).

(Continued)

*Primary Examiner* — Ganapathirama Raghu
(74) *Attorney, Agent, or Firm* — Greenblum & Bernstein, P.L.C.

(57) ABSTRACT

The present invention provides a carbonyl reductase having the activity of reducing a carbonyl group-containing compound to convert the compound into an optically active compound, and a production method of an optically active compound using the enzyme. Specifically, a carbonyl reductase having one or more mutations in which the 54th aspartic acid, the 157th methionine, the 170th alanine, the 211th isoleucine, the 214th methionine, and the 249th methionine are each substituted by other specific amino acid in the amino acid sequence shown in SEQ ID NO: 1 or a homologue of the amino acid sequence, and a production method of an optically active compound using the same are provided.

11 Claims, No Drawings
Specification includes a Sequence Listing.

(56) References Cited

OTHER PUBLICATIONS

Honda et al., "Improvement of operational stability of *Ogataea minuta* carbonyl reductase for chiral alcohol production", Journal of Bioscience and Bioengineering, 123(6):673-678 (2017).
Honda et al., "Expression of engineered carbonyl reductase from *Ogataea minuta* in *Rhodococcus opacus* and its application to whole-cell bioconversion in anhydrous solvents", Journal of Bioscience and Bioengineering, 127(2):145-149 (2019).
EESR for EP App. No. 2088977.6, dated Dec. 6, 2023.
Office Action for JP App. No. 2021-558467, dated Nov. 12, 2024 (w/ translation).

\* cited by examiner

CARBONYL REDUCTASE, NUCLEIC ACID ENCODING SAME, AND METHOD FOR PRODUCING OPTICALLY ACTIVE COMPOUND USING SAME

TECHNICAL FIELD

The present invention relates to a carbonyl reductase having the activity of reducing a carbonyl group-containing compound into an optically active compound, which is an industrially useful compound as an intermediate raw material for pharmaceutical products, pesticides, and the like, a nucleic acid encoding the carbonyl reductase, a recombinant vector containing the nucleic acid, a transformant containing the recombinant vector, and further, a method for producing an optically active compound by using the carbonyl reductase and the like.

BACKGROUND ART

Statin compounds such as rosuvastatin, pitavastatin, atorvastatin, fluvastatin, and pravastatin, and salts thereof are HMG-CoA reductase inhibitors and are useful for the treatment of hypercholesterolemia, mixed abnormal lipidemia, and the like. In recent years, generic drugs have been placed on the market as drugs using these statin-based compounds or salts thereof, and a method for industrially producing them at a lower cost has been desired.

These statin-based compounds are optically active alcohols or salts thereof having the following structure:

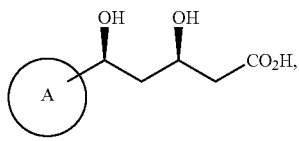

and a production method including stereoselectively reducing a carbonyl group-containing compound having a structure in which the following carbonyl group is successively present

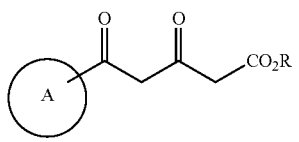

by an organic synthetic or biochemical method is known.

For example, Patent Literature 1 describes a method for producing an optically active compound, such as an optically active alcohol, with high optical purity and high concentration by reacting a carbonyl group-containing compound with a specific carbonyl reductase (hereinafter to be referred to as "OCR1" at times). Patent Literature 2 describes a production method of rosuvastatin calcium by using OCR1, and Patent Literature 3 describes a production method of pitavastatin calcium by using OCR1.

OCR1 has poor thermal stability, and the stability of the enzyme decreases during reaction (during heating), and therefore, a large amount of OCR1 needs to be used. Thus, variants are being studied for the purpose of improving the thermal stability of OCR1 (Non Patent Literature 1).

However, in order to industrially produce optically active compounds, especially statin-based compounds, which are useful as intermediate raw materials for pharmaceutical products, pesticides and the like, with high purity, high optical purity, and low cost, further improvement in the property of OCR1 has been desired.

CITATION LIST

Patent Literature

[PTL 1]
JP-B-4270918
[PTL 2]
WO 2015/119261
[PTL 3]
WO 2017/022846

Non Patent Literature

[NPL 1]
Journal of Bioscience and Bioengineering, VOL. 123 No. 6, 673-678, 2017

SUMMARY OF INVENTION

Technical Problem

A problem to be solved by the present invention is to develop a carbonyl reductase having higher carbonyl reducing activity, thermal stability, stereoselectivity, optical selectivity, and the like than OCR1. A further problem to be solved by the present invention is to industrially obtain an optically active compound with high purity, high optical purity, and low cost by using the carbonyl reductase.

Solution to Problem

The present inventors have conducted intensive studies in an attempt to solve the above-mentioned problems and found that a carbonyl reductase having high carbonyl reducing activity, thermal stability, stereoselectivity, optical selectivity, and the like can be obtained by substituting a specific amino acid of OCR1 with another specific amino acid, which resulted in the completion of the present invention. Furthermore, they have found that an optically active compound can be obtained industrially with high purity, high optical purity, and low cost by using the carbonyl reductase, which resulted in the completion of the present invention.

That is, the gist of the present invention is as follows.

[1] A carbonyl reductase comprising a polypeptide consisting of an amino acid sequence comprising at least one mutation selected from the group consisting of the following (a) to (f) in the amino acid sequence shown in SEQ ID NO: 1 or a homologue of the amino acid sequence:
(a) a mutation in which the 54th aspartic acid in the amino acid sequence shown in SEQ ID NO: 1 is substituted by valine
(b) a mutation in which the 157th methionine in the amino acid sequence shown in SEQ ID NO: 1 is substituted by valine
(c) a mutation in which the 170th alanine in the amino acid sequence shown in SEQ ID NO: 1 is substituted by serine
(d) a mutation in which the 211th isoleucine in the amino acid sequence shown in SEQ ID NO: 1 is substituted by alanine or asparagine (e) a mutation in which the 214th methionine in the amino acid sequence shown in SEQ ID NO: 1 is substituted by leucine (f) a mutation in which the 249th methionine in the amino acid sequence shown in SEQ ID NO: 1 is substituted by leucine.

[2] The carbonyl reductase of [1], comprising at least two mutations selected from the group consisting of the aforementioned (a) to (f).

[3] The carbonyl reductase of [1] or [2], wherein the polypeptide consists of an amino acid sequence further comprising (g) a mutation in which the 166th valine in the amino acid sequence shown in SEQ ID NO: 1 is substituted by alanine, in the amino acid sequence shown in SEQ ID NO: 1 or a homologue of the amino acid sequence.

[4] A method for producing an optically active compound represented by the following formula (IV)

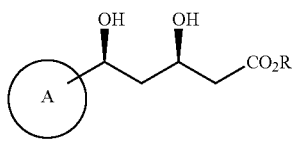
(IV)

wherein R is a hydrogen atom, an alkyl group, or an aryl group, and

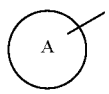

is a substituent having an aromatic ring and/or a heterocycle, comprising asymmetrically reducing a carbonyl group-containing compound selected from the group consisting of compounds represented by the following formulas (I), (II) and (III):

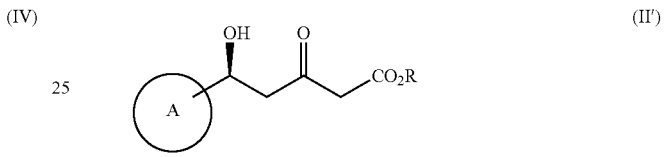
(I)

(II)

(III)

in the above-mentioned formulas (I), (II) and (III), R is as defined above, and

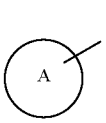

is as defined above, by bringing the carbonyl group-containing compound into contact with the carbonyl reductase of any of [1] to [3], a microorganism or cell having the ability to produce the aforementioned enzyme, a processed product of the aforementioned microorganism or cell, and/or a culture medium containing the aforementioned enzyme obtained by culturing the aforementioned microorganism or cell.

[5] The production method of [4], wherein the carbonyl group-containing compounds represented by the aforementioned formula (II) and the aforementioned formula (III) are respectively an optically active form represented by the following formula (II')

(II')

wherein R and (A)

are as defined above,
and an optically active form represented by the following formula (III')

(III')

wherein R and (A)

are as defined above.

[6] The production method of [4] or [5], wherein the substituent (A)

is

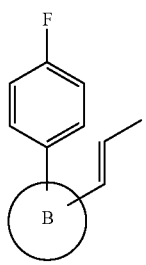

wherein

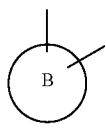

is a substituent having an aromatic ring and/or a heterocycle,

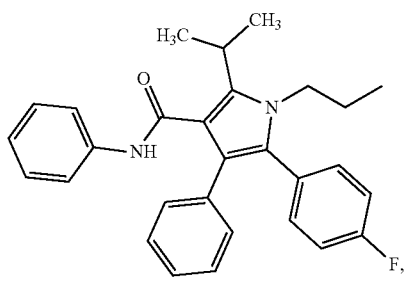

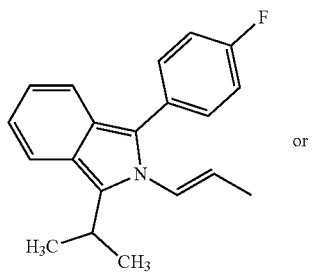

or

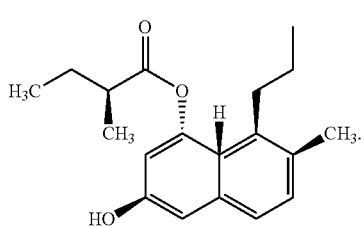

[7] The production method of [6], wherein the substituent

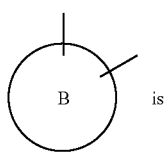

is

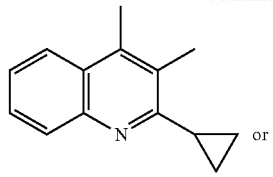

or

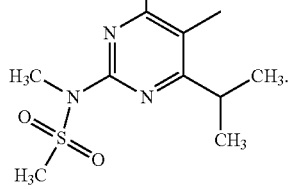

[8] The production method of any of [4] to [7], wherein the aforementioned microorganism or cell is a microorganism or cell transformed with a nucleic acid encoding the carbonyl reductase of any of [1] to [3] and comprising a base sequence shown by the following (p), (q) or (r):

(p) a base sequence having a base sequence resulting from the substitution, deletion, and/or addition of one or multiple bases in the base sequence shown in SEQ ID NO: 2 and encoding a polypeptide having carbonyl reductase activity (q) a base sequence having a base sequence having not less than 90% sequence identity with the base sequence shown in SEQ ID NO: 2 and encoding a polypeptide having carbonyl reductase activity (r) a base sequence having a base sequence that hybridizes with a complementary strand of the base sequence shown in SEQ ID NO: 2 under stringent conditions and encoding a polypeptide having carbonyl reductase activity.

In the present specification, the substituent

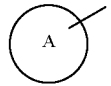

is sometimes to be referred to as "substituent A", and the substituent

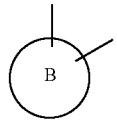

sometimes to be referred to as "substituent B".

Advantageous Effects of Invention

According to the present invention, a carbonyl reductase having the activity of reducing a carbonyl group-containing compound into an optically active compound, which is an industrially useful compound as an intermediate raw material for pharmaceutical products, pesticides, and the like, a nucleic acid encoding the carbonyl reductase, a recombinant vector containing the nucleic acid, a transformant containing the recombinant vector can be provided. According to the present invention, moreover, a production method for industrially obtaining an optically active compound, which is industrially useful as an intermediate raw material for medicaments, pesticides, and the like, with high purity, high optical purity, and low cost can be provided.

DESCRIPTION OF EMBODIMENTS

The present invention is explained in detail in the following.

1. Carbonyl Reductase of the Present Invention

The carbonyl reductase of the present invention contains a polypeptide consisting of an amino acid sequence containing at least one mutation selected from the group consisting of the following (a) to (f) in the amino acid sequence shown in SEQ ID NO: 1 or a homologue of the amino acid sequence, and has carbonyl reductase activity:

(a) a mutation in which the 54th aspartic acid in the amino acid sequence shown in SEQ ID NO: 1 is substituted by valine
(b) a mutation in which the 157th methionine in the amino acid sequence shown in SEQ ID NO: 1 is substituted by valine
(c) a mutation in which the 170th alanine in the amino acid sequence shown in SEQ ID NO: 1 is substituted by serine
(d) a mutation in which the 211th isoleucine in the amino acid sequence shown in SEQ ID NO: 1 is substituted by alanine or asparagine
(e) a mutation in which the 214th methionine in the amino acid sequence shown in SEQ ID NO: 1 is substituted by leucine
(f) a mutation in which the 249th methionine in the amino acid sequence shown in SEQ ID NO: 1 is substituted by leucine.

In the present specification, the carbonyl reductase activity means an activity to convert a carbonyl group in a carbonyl group-containing compound to an optically active compound by asymmetric reduction. Whether or not the carbonyl reductase activity is present can be determined by measuring an activity to asymmetrically reduce a carbonyl group in a carbonyl group-containing compound to convert the compound to an optically active compound by a general assay method. For example, a carbonyl group-containing compound represented by the formula (I), (II) or (III) is reacted with a carbonyl reductase to be a measurement target, a microorganism or cell having the ability to produce the enzyme, a processed product of the microorganism or cell, and/or a culture medium containing the aforementioned enzyme obtained by culturing the microorganism or cell, and the amount of a compound represented by the formula (IV) converted from these carbonyl group-containing compounds is directly measured, whereby the carbonyl reductase activity can be confirmed. In the case of a measurement system containing NADPH as a coenzyme, the carbonyl reductase activity can be detected by measuring an initial rate of NADPH depletion.

In the present invention, the amino acid sequence shown in SEQ ID NO: 1 is an amino acid sequence (OCR1) derived from *Ogataea minuta* var. *nonfermentans* NBRC (former IFO) 1473 described in JP-B-4270918.

In the present invention, the homologue of the amino acid sequence shown in SEQ ID NO: 1 is a polypeptide having an amino acid sequence resulting from deletion, insertion, substitution and/or addition of one or multiple amino acids in the amino acid sequence shown in SEQ ID NO: 1, and having carbonyl reductase activity.

The "one or multiple amino acids" means generally 1-100, preferably 1-50, more preferably 1-20, further preferably 1-10, particularly preferably 1-5, amino acids.

In the present invention, the homologue of the amino acid sequence shown in SEQ ID NO: 1 is a polypeptide having an amino acid sequence having not less than 90% sequence identity with the full-length amino acid sequence shown in SEQ ID NO: 1, and also having carbonyl reductase activity. Preferably, it is a polypeptide having an amino acid sequence having not less than 95%, more preferably not less than 98%, further preferably not less than 99%, sequence identity with the full-length amino acid sequence shown in SEQ ID NO: 1, and also having carbonyl reductase activity.

The homology (to be also referred to as identity or similarity) of the amino acid sequences in the present specification can be calculated using homology calculation algorithm NCBI BLAST (National Center for Biotechnology Information Basic Local Alignment Search Tool) and, for example, under the following conditions (expectancy=10; gap allowed; matrix=BLOSUM62; filtering=OFF). Examples of other algorithm for determining the homology of the amino acid sequence include the algorithm described in Karlin et al., Proc. Natl. Acad. Sci. USA, 90: 5873-5877 (1993) [said algorithm is incorporated in the NBLAST and XBLAST program (version 2.0) (Altschul et al., Nucleic Acids Res., 25: 3389-3402 (1997))], the algorithm described in Needleman et al., J. Mol. Biol., 48: 444-453 (1970) [said algorithm is incorporated in the GAP program in the GCG software package], the algorithm described in Myers and Miller, CABIOS, 4: 11-17 (1988) [said algorithm is incorporated in ALIGN program (version2.0) which is a part of the CGC sequence alignment software package], the algorithm described in Pearson et al., Proc. Natl. Acad. Sci. USA, 85: 2444-2448 (1988) [said algorithm is incorporated in the FASTA program in the GCG software package] and the like, and these can also be similarly used preferably.

The above-mentioned amino acid sequence shown in SEQ ID NO: 1 and a homologue of the amino acid sequence can be obtained by the method described in JP-B-4270918.

The carbonyl reductase of the present invention has superior properties because it has a mutation of (a), (b), (c), (d), (e), or (f) in the amino acid sequence shown in SEQ ID NO: 1 or a homologue of the amino acid sequence. The respective mutations are explained below in the order of (d), (c), (f), (a), (b), and (e).

The mutation of (d) is a mutation in which the 211th isoleucine in the amino acid sequence shown in SEQ ID NO: 1 is substituted by alanine or asparagine. This mutation improves stereoselectivity and optical selectivity.

Specifically, the property of selectively reducing the 3-position carbonyl group of a carbonyl group-containing compound represented by the following formula (I) or (II) is improved. Therefore, an optically active compound represented by the formula (IV) can be obtained with high yield and high chemical purity from a carbonyl group-containing compound represented by the formula (I) or (II). In addition, since the mutation of (d) also improves optical selectivity, an optically active compound represented by the formula (IV) can be obtained with high yield and high optical purity from a carbonyl group-containing compound represented by the formula (I), (II) or (III).

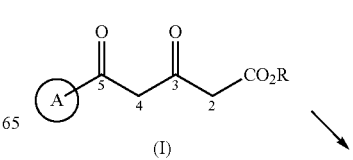

(I)

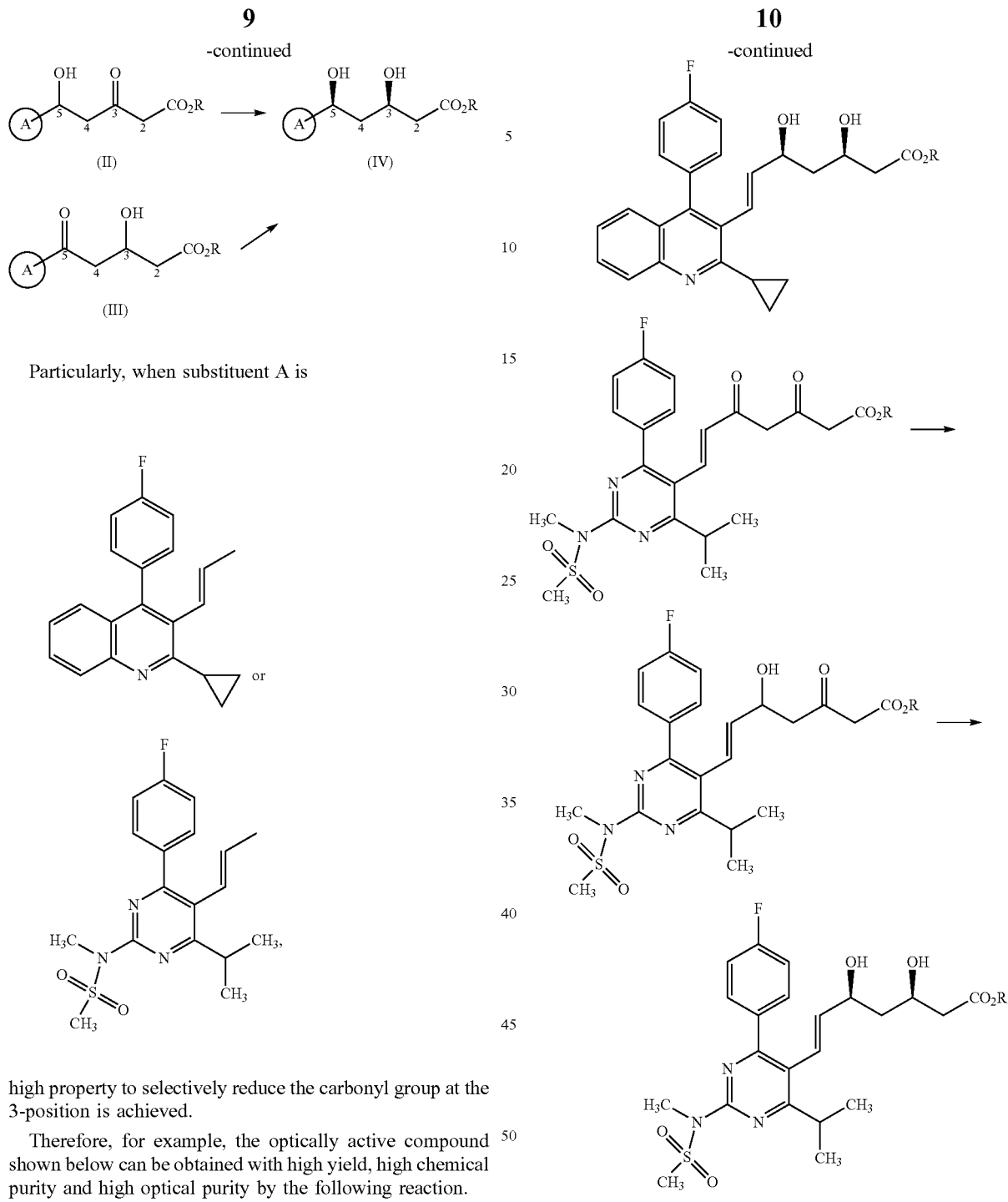

Particularly, when substituent A is

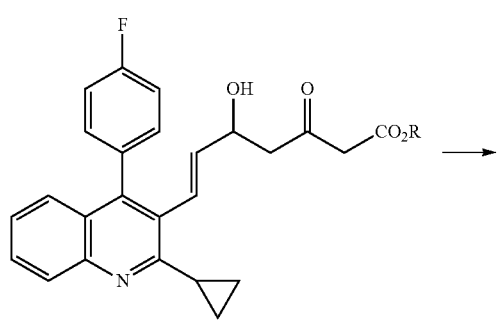

high property to selectively reduce the carbonyl group at the 3-position is achieved.

Therefore, for example, the optically active compound shown below can be obtained with high yield, high chemical purity and high optical purity by the following reaction.

The mutation of (c) is a mutation in which the 170th alanine in the amino acid sequence shown in SEQ ID NO: 1 is substituted by serine. This mutation improves thermal stability.

The mutation of (f) is a mutation in which the 249th methionine in the amino acid sequence shown in SEQ ID NO: 1 is substituted by leucine. This mutation improves thermal stability.

Due to these mutations, the activity of carbonyl reductase does not decrease even in the reduction reaction under heating conditions, and high enzyme activity is maintained. Therefore, an optically active compound represented by the formula (IV) can be obtained with high yield and high chemical purity from a carbonyl group-containing compound represented by the formula (I), (II) or (III). The presence of both the mutation of (c) and the mutation of (f) is preferable because the thermal stability is further improved.

The mutation of (a) is a mutation in which the 54th aspartic acid in the amino acid sequence shown in SEQ ID NO: 1 is substituted by valine. This mutation improves stereoselectivity.

Specifically, the property of selectively reducing the 3-position carbonyl group of a carbonyl group-containing compound represented by the above-mentioned formula (I) or (II) is improved. Therefore, an optically active compound represented by the above-mentioned formula (IV) can be obtained with high yield and high chemical purity.

Particularly, when substituent A is

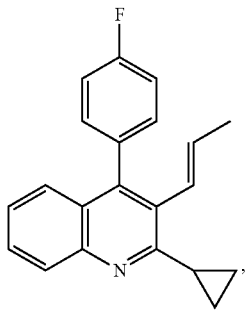 [SMILES: C/C=C/c1c(C2CC2)nc2ccccc2c1-c1ccc(F)cc1]

the reaction rate and reaction efficiency with respect to the carbonyl group-containing compound are improved.

Therefore, for example, by the following reaction, the production rate and production efficiency of the optically active compound shown below are improved, and the optically active compound can be obtained with high yield, high chemical purity, and high optical purity.

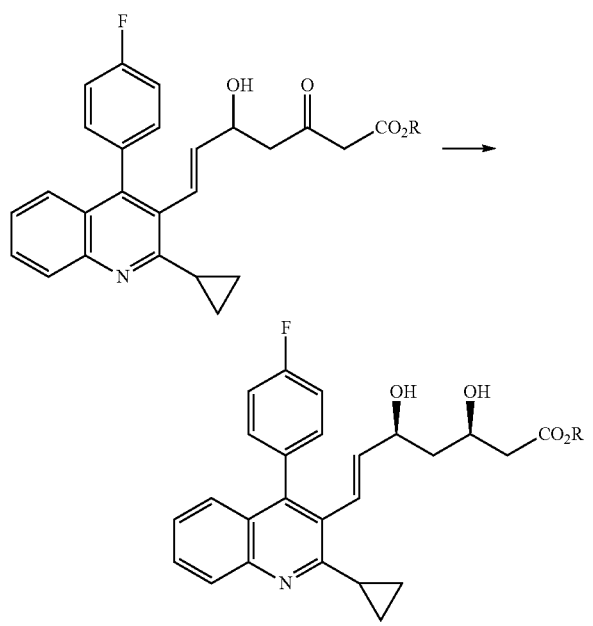

The mutation of (b) is a mutation in which the 157th methionine in the amino acid sequence shown in SEQ ID NO: 1 is substituted by valine. This mutation improves stereoselectivity and optical selectivity.

The mutation of (e) is a mutation in which the 214th methionine in the amino acid sequence shown in SEQ ID NO: 1 is substituted by leucine. This mutation improves stereoselectivity and optical selectivity.

Here, when a carbonyl reductase having the amino acid sequence shown in SEQ ID NO: 1 is reacted with a carbonyl group-containing compound represented by the following formula (I)

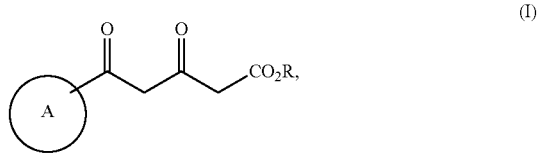

the carbonyl group at the 3-position is reduced preferentially over the carbonyl group at the 5-position. Therefore, a compound represented by the following formula (III)

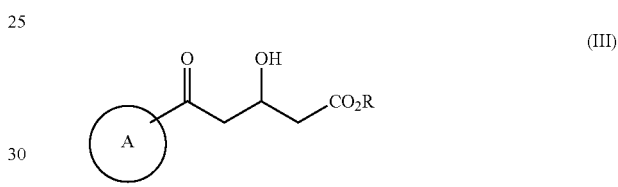

is produced more than a compound represented by the following formula (II)

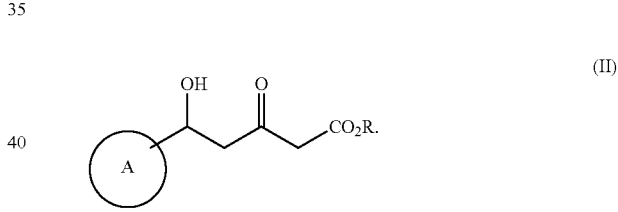

In addition, the reaction rate from the compound represented by the above-mentioned formula (III) to a compound represented by the following formula (IV)

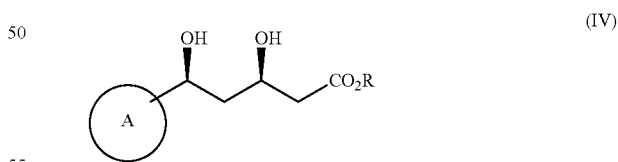

is slower than the reaction rate from the compound represented by the above-mentioned formula (II) to optically active compound represented by the above-mentioned formula (IV). Therefore, the compound represented by the above-mentioned formula (III) may remain.

When carbonyl reductase having mutation of (b) and mutation of (e) is reacted with the above-mentioned carbonyl group-containing compound represented by the formula (I), the reduction of the carbonyl group at the 3-position is suppressed, and the carbonyl groups at the 3-position and the 5-position are reduced in a well-balanced manner. The reaction rate and reaction efficiency in converting the above-mentioned compounds represented by the formulas (II) and (III) to the above-mentioned optically active compound represented by the formula (IV) are improved. Therefore, the above-mentioned optically active compound represented by the formula (IV) can be efficiently obtained with high yield and high chemical purity.

Particularly, when substituent A is

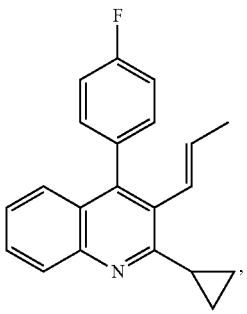 [SMILES: C/C=C/c1c(C2CC2)nc2ccccc2c1-c1ccc(F)cc1]

the reaction rate and reaction efficiency of converting a carbonyl group-containing compound to an optically active compound are further improved.

Therefore, for example, by the following reaction, the production rate and production efficiency of the optically active compound shown below are improved, and the optically active compound can be obtained with high yield, high chemical purity, and high optical purity.

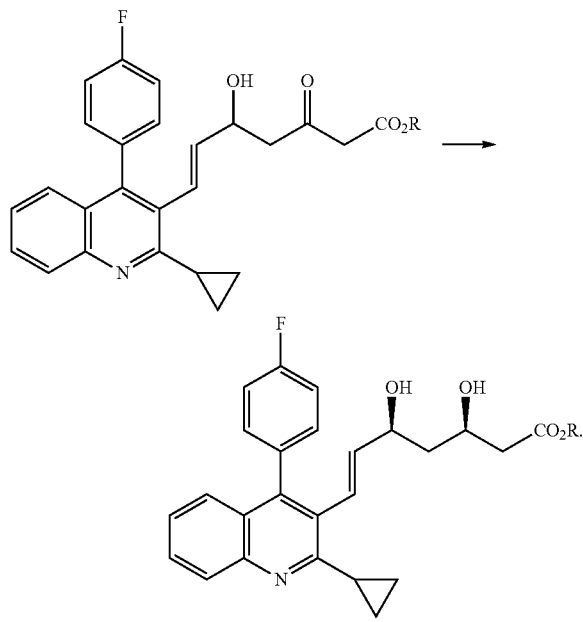

Furthermore, the presence of both the mutation of (b) and the mutation of (e) is more preferable because the reaction efficiency with respect to a carbonyl group-containing compound is also improved.

The carbonyl reductase of the present invention is a carbonyl reductase containing a polypeptide consisting of an amino acid sequence containing at least one mutation selected from the group consisting of the above-mentioned (a) to (f) in the amino acid sequence shown in SEQ ID NO: 1 or a homologue of the amino acid sequence, and having carbonyl reductase activity. One or more mutations can be appropriately selected from the mutations of (a), (b), (c), (d), (e), and (f) depending on the kind of the desired above-mentioned optically active compound represented by the formula (IV). It is preferable to have at least two, and further at least three, mutations selected from the group consisting of (a) to (f).

The carbonyl reductase of the present invention optionally has mutation of (g). The mutation of (g) is a mutation described in Non Patent Literature 1, and is a mutation in which the 166th valine in the amino acid sequence shown in SEQ ID NO: 1 is substituted by alanine. This mutation improves the thermal stability of carbonyl reductase.

The carbonyl reductase of the present invention can be produced from an amino acid sequence having carbonyl reductase activity which is the amino acid sequence shown in SEQ ID NO: 1 or a homologue of the amino acid sequence, by a technique known to those skilled in the art, for example, a well-known technique such as a site-directed mutagenesis method, a PCR method, or the like.

In addition, the carbonyl reductase of the present invention can also be produced by culturing a transformant containing a nucleic acid encoding same, and separating and purifying the carbonyl reductase from the obtained culture. The nucleic acid encoding the carbonyl reductase of the present invention may be a DNA or an RNA, or DNA/RNA chimera. It is preferably a DNA. The nucleic acid may be double stranded or single stranded. When the nucleic acid is double stranded, it may be a double stranded DNA, a double stranded RNA or a DNA:RNA hybrid. When the nucleic acid is single stranded, it may be a sense strand (that is, coding strand) or antisense strand (that is, non-coding strand).

As the DNA encoding the carbonyl reductase of the present invention, synthetic DNA or the like can be mentioned. For example, it can be obtained by converting full-length carbonyl reductase cDNA which was directly amplified by Reverse Transcriptase-PCR using total RNA or mRNA fraction prepared from the cells or tissues derived from *Ogataea minuta* var. *nonfermentans* NBRC1473 strain as a template, according to a method known per se such as ODA-LA PCR method, Gapped duplex method, Kunkel method and the like or a method analogous thereto, and using a known kit, for example, Mutan™-super Express Km (TAKARA BIO INC.), Mutan™-K (TAKARA BIO INC.) or the like. Alternatively, it can also be obtained from a cDNA library prepared by inserting the above-mentioned total RNA or mRNA fragments in suitable vectors, by converting, according to the above-mentioned method, the cDNA cloned by a colony or plaque hybridization method, PCR method or the like. The vector used for the library may be any such as bacteriophage, plasmid, cosmid, phagemid or the like.

The nucleic acid encoding a polypeptide having the amino acid sequence shown in SEQ ID NO: 1 is not limited as long as it encodes the polypeptide having carbonyl reductase activity of the present invention. Particularly, one having the base sequence shown in the following (p), (q) or (r) can be mentioned.

(p) a nucleic acid having a base sequence resulting from the substitution, deletion, and/or addition of one or multiple bases in the base sequence shown in SEQ ID NO: 2 and encoding a polypeptide of the present invention having carbonyl reductase activity (q) a nucleic acid having a base sequence having not less than 90% sequence identity with the base sequence shown in SEQ ID NO: 2 and encoding a polypeptide of the present invention having carbonyl reductase activity (r) a nucleic acid having a base sequence that hybridizes with a complementary strand of the base sequence shown in SEQ ID NO: 2 under stringent conditions and encoding a polypeptide of the present invention having carbonyl reductase activity.

The homologue of the nucleic acid of the aforementioned (p) is, for example, a nucleic acid containing a base sequence resulting from deletion, substitution, insertion and/or addition of one or multiple bases in the base sequence shown in SEQ ID NO: 2 and encoding a polypeptide having the carbonyl reductase activity of the present invention. In the case of substitution, insertion or addition, one or multiple bases are preferably substituted, inserted or added. As used herein, "one or multiple bases" refers to, for example, 1-60, preferably 1-30, more preferably 1-15, further preferably 1-10, particularly preferably 1-5, bases.

The homologue of the nucleic acid of the aforementioned (q) is, for example, a nucleic acid having a base sequence with not less than 90% of sequence identity with the base sequence of SEQ ID NO: 2, and encoding a polypeptide having the carbonyl reductase activity of the present invention. Preferably, it is a nucleic acid having a base sequence with a homology (also referred to as an identity) of not less than 95%, more preferably not less than 98%, further preferably not less than 99, with the base sequence shown in SEQ ID NO: 2, and encoding a polypeptide having the carbonyl reductase activity of the present invention.

The homology (to be also referred to as identity) of the base sequences in the present specification can be calculated using homology calculation algorithm NCBI BLAST (National Center for Biotechnology Information Basic Local Alignment Search Tool) and, for example, under the following conditions (expectancy=10; gap allowed; filtering=ON; matching score=1; mismatch score=–3). Similar preferable examples of other algorithm for determining the homology of the base sequence include the above-mentioned homology calculation algorithm of amino acid sequence.

The homologue of the nucleic acid of the aforementioned (r) may be a nucleic acid that hybridizes to the complementary strand of the base sequence of SEQ ID NO: 2 under stringent conditions as long as it encodes a polypeptide having the carbonyl reductase activity of the present invention. The "stringent conditions" here can be appropriately determined by reference to the conditions in previous reports (e.g., Current Protocols in Molecular Biology, John Wiley & Sons, 6.3.16.3.6, 1999). Specifically, for example, the conditions include washing once, more preferably 1-3 times, at the salt concentration and temperature corresponding to the washing conditions of general Southern hybridization; 60° C., 1×SSC, 0.1% SDS, preferably, 0.1×SSC, 0.1% SDS, further preferably, 65° C., 0.1×SSC, 0.1% SDS, 68° C., 0.1×SSC, 0.1% SDS etc. (highly stringent conditions), and the like can be mentioned.

Those of ordinary skill in the art can appropriately carry out substitution, deletion, insertion and/or addition to the nucleic acid shown in SEQ ID NO: 2 by using a site-directed mutagenesis method (Nucleic Acids Res. 10, pp. 6487 (1982), Methods in Enzymol. 100, pp. 448 (1983), Molecular Cloning, PCR A Practical Approach IRL Press pp. 200 (1991)) and the like to introduce the desired mutation, whereby the above-mentioned homologue of the nucleic acid can be obtained.

The nucleic acid of the present invention can encode a polypeptide having the carbonyl reductase activity of the present invention. When the nucleic acid of the present invention has a base sequence shown in SEQ ID NO: 2, or a base sequence having high identity with the base sequence shown in SEQ ID NO: 2, the level of the carbonyl reductase activity of the carbonyl reductase containing a polypeptide encoded by the nucleic acid may be quantitatively equivalent to that of a hydrolase containing a polypeptide having the amino acid sequence shown in SEQ ID NO: 1, or that containing a polypeptide having the homologue of the amino acid sequence, or may vary within an acceptable range (e.g., about 0.1-about 5 times, preferably about 0.3-about 3 times).

In addition, based on the amino acid sequence in the amino acid sequence shown in SEQ ID NO: 1 or a part thereof, the base sequence shown in SEQ ID NO: 2 or a part thereof, it is also possible to perform homology search on, for example, a database such as DNA Databank of JAPAN (DDBJ) and the like to obtain the amino acid sequence information of the polypeptide having carbonyl reductase activity or the base sequence information of the DNA encoding the same.

In the below-mentioned production method of the present invention, the aforementioned carbonyl reductase may be directly used in the reaction with a carbonyl group-containing compound as a substrate; however, it is preferable to use a microorganism or cell capable of producing the enzyme, a processed product of the microorganism or cell, and/or a culture solution containing the enzyme obtained by culturing the microorganism or cell.

As the microorganism or cell having the ability to produce the carbonyl reductase of the present invention, a microorganism or cell that originally has an ability to produce the carbonyl reductase may be used, or a microorganism or cell imparted with the aforementioned producing ability by breeding may be used. The microorganism or cell may be alive or dead and, for example, a quiescent fungus/bacterium or the like can be preferably used. Examples of the species of the microorganism or the type of the cell having the ability to produce the carbonyl reductase of the present invention include those described below as the "host microorganism" or "host cell".

As a means for imparting the aforementioned producing ability by breeding, known methods such as a gene recombination treatment (transformation), a mutagenesis treatment and the like can be adopted. As a method of transformation, a method for introducing the DNA of interest, a method of enhancing the expression of a DNA of interest by modifying an expression regulatory sequence such as a promoter on a chromosome, and the like can be mentioned.

Among these, it is preferable to use a microorganism or cell transformed with DNA encoding the aforementioned polypeptide of the present invention.

A nucleic acid (DNA) encoding the polypeptide (carbonyl reductase) of the present invention can be cloned by, as described above, PCR using chromosomal DNA derived from *Ogataea minuta* var. *nonfermentans* NBRC1473 strain as a template, and appropriate primers.

A nucleic acid (DNA) encoding the polypeptide (carbonyl reductase) of the present invention can be cloned by, as described above, preparing full-length carbonyl reductase cDNA directly amplified by RT-PCR using total RNA or mRNA derived from *Ogataea minuta* var. *nonfermentans* NBRC1473 strain as a template, followed by PCR using appropriate primers.

For example, by inserting the DNA encoding the polypeptide of the present invention obtained as mentioned above into a known expression vector in a configuration enabling expression, the polypeptide gene expression vector of the present invention is provided. Then, by transforming the host cell with the expression vector, a transformant into which a DNA encoding the polypeptide of the present invention is introduced can be obtained. The transformant can also be obtained by incorporating the DNA encoding the polypeptide of the present invention into the chromosomal DNA of the host by a method such as homologous recombination and the like in order to enable its expression.

In the present specification, an "expression vector" is a genetic factor used for replicating and expressing a protein having a desired function in the aforementioned host organism, by incorporating a polynucleotide encoding a protein having a desired function to be introduced into a host organism. Examples thereof include, but are not limited to, plasmid, virus, phage, cosmid and the like. Preferable expression vector is a plasmid.

In the present specification, the "transformant" means a microorganism or cell into which the gene of interest is introduced using the aforementioned expression vector and the like, and which has acquired an ability to show a desired phenotype associated with a protein having a desired function.

Specifically, as a method for producing a transformant, a method including introducing a DNA encoding the polypeptide of the present invention into a plasmid vector, a phage vector, or a viral vector that is stably present in a host cell, and introducing the constructed expression vector into the host cell, and a method including introducing the DNA directly into the host genome to cause transcription and translation of the genetic information can be mentioned. In this case, it is preferable to join a suitable promoter to the upstream on the 5'-side of the DNA in the host, and it is more preferable to join the terminator to the downstream on the 3'-side. Such promoter and terminator are not particularly limited as long as they are known to function in the cell utilized as the host. For example, the vector, promoter and terminator described in detail in "Basic Course of Microbiology 8 genetic engineering, Kyoritsu Shuppan" can be used.

The host microorganism to be transformed to express the carbonyl reductase of the present invention is not particularly limited as long as the host does not give an adverse influence on a carbonyl group-containing compound as a substrate and the desired optically active compound. For example, the following microorganisms can be mentioned.

Bacteria with established host vector system belonging to the genera *Escherichia, Bacillus, Pseudomonas, Serratia, Brevibacterium, Corynebacterium, Streptococcus, Lactobacillus* and the like.

Actinomycetes with established host vector system belonging to the genera *Rhodococcus, Streptomyces* and the like.

Yeast with established host vector system belonging to the genera *Saccharomyces, Kluyveromyces, Schizosaccharomyces, Zygosaccharomyces, Yarrowia, Trichosporon, Rhodosporidium, Hansenula, Pichia, Candida* and the like.

Molds with established host vector system belonging to the genera *Neurospora, Aspergillus, Cephalosporium, Trichoderma* and the like.

The procedure for preparing the transformant, the construction of the recombinant vector suitable for the host, and the method for culturing the host can be performed according to the techniques conventionally used in the fields of molecular biology, biotechnology, and genetic engineering (e.g., the method described in Green et al., Molecular Cloning: A Laboratory Manual (4th ed.) Cold Spring Harbor Press, Cold Spring Harbor, NY (2012)).

Specific examples of a preferred host microorganism, a preferred transformation method in each microorganism, vector, promoter, terminator, and the like are recited in the following; however, the present invention is not limited to these examples.

In *Escherichia*, particularly *Escherichia coli*, the plasmid vector includes, for example, pBR, pUC series plasmids and the like, and promoters derived from lac (β-galactosidase), trp (tryptophan operon), tac, trc (fusion of lac, trp), λ phage PL, PR and the like, and the like. The terminator includes, for example, terminators derived from trpA, derived from phage, derived from rrnB ribosomal RNA and the like.

In *Bacillus*, the vector includes, for example, pUB110 series plasmids, pC194 series plasmids and the like, which may also be integrated with the chromosome. As the promoter and terminator, promoters and terminators of enzyme gene such as alkaline protease, neutral protease, α-amylase and the like, and the like can be utilized.

In *Pseudomonas*, the vector includes, for example, general host vector systems established in *Pseudomonas putida, Pseudomonas cepacia* and the like, a plasmid relating to the decomposition of a toluene compound, broad host range vector based on TOL plasmid (including gene necessary for autonomous replication derived from RSF1010 and the like) pKT240 (Gene, 26, 273-82 (1983)) and the like.

In *Brevibacterium*, particularly *Brevibacterium lactofermentum*, the vector includes, for example, plasmid vectors such as pAJ43 (Gene 39, 281 (1985)) and the like. As the promoter and terminator, various promoters and terminators used in *Escherichia coli* can be used.

In *Corynebacterium*, particularly *Corynebacterium glutamicum*, the vector includes, for example, plasmid vectors such as pCS11 (JP-A-S57-183799), pCB101 (Mol. Gen. Genet. 196, 175 (1984)) and the like.

In *Saccharomyces*, particularly *Saccharomyces cerevisiae*, the vector includes, for example, YRp series, YEp series, YCp series, YIp series plasmid and the like. In addition, promoters and terminators of various enzyme genes such as alcohol dehydrogenase, glyceraldehyde-3-phosphate dehydrogenase, acidic phosphatase, β-galactosidase, phosphoglycerate kinase, enolase can be used.

In *Schizosaccharomyces*, the vector includes, for example, plasmid vectors derived from *Schizosaccharomyces pombe* described in Mol. Cell. Biol. 6, 80 (1986) and the like. Particularly, pAUR224 is commercially available from Takara Bio Inc. and can be utilized with ease.

In *Aspergillus, Aspergillus niger, Aspergillus oryzae* and the like are most studied among molds, integrations into plasmids and chromosomes are available, and promoters derived from extracellular proteases and amylase can be used (Trends in Biotechnology 7, 283-287 (1989)).

In addition to the above, host vector systems corresponding to various microorganisms have been established, and they can be used as appropriate.

In addition to microorganisms, various host/vector systems have been established in plants and animals. Particularly, a system for expressing a large amount of heterologous protein in animals such as insect (e.g., silkworm) and the like (Nature 315, 592-594 (1985)), plants such as *Brassica*, corn, potato and the like, and a system using a cell-free protein synthesis system of *Escherichia coli* cell-free extract or wheat germ and the like has been established, and they can be preferably utilized.

Examples of the processed product of a microorganism or cell having the ability to produce the carbonyl reductase of the present invention include cell preparations such as the microorganism or cell treated with an organic solvent such as acetone, dimethyl sulfoxide (DMSO), toluene or the like, or a surfactant, or freeze-dry treated, or physically or enzymatically disrupted microorganism or cell, or the like, an enzyme fraction in the microorganism or cell which was obtained as a crude product or purified product, and further, those immobilized on a carrier represented by polyacrylamide gel, carageenan gel or the like, and the like.

Examples of the culture solution containing the enzyme obtained by culturing a microorganism or cell having the ability to produce the carbonyl reductase of the present invention include a suspension of the cell and a liquid medium and, when the cell is a type with secretory expression, a supernatant obtained by removing the cell by centrifugation or the like or a concentrate thereof.

2. Composition of the Present Invention

The composition (enzymatic agent) of the present invention contains the carbonyl reductase of the present invention, a microorganism or cell having the ability to produce the enzyme, a processed product of the microorganism or cell, and/or a culture solution containing the enzyme obtained by culturing the microorganism or cell, and catalyzes a reaction using a carbonyl group-containing compound represented by of the formula (I), (II) or (III)

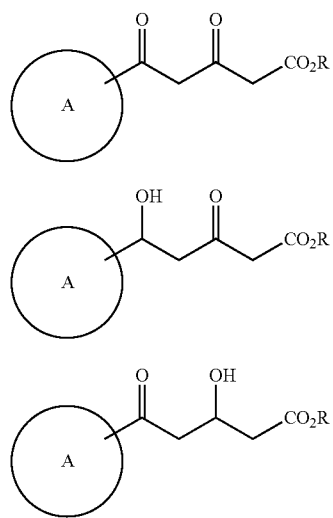

as a substrate to produce an optically active compound represented by the formula (IV)

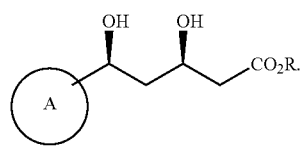

The composition of the present invention is useful because the optically active compound, which is industrially useful as an intermediate raw material for medicaments, pesticides, and the like can be industrially produced with high purity, high optical purity, and low cost by using the composition as a catalyst.

The composition of the present invention may contain excipient, buffering agent, suspension, stabilizer, preservative, antiseptic, saline and the like in addition to the active ingredient (enzyme, etc.). As the excipient, lactose, sorbitol, D-mannitol, sucrose and the like can be used. As the buffering agent, phosphate, citrate, acetate and the like can be used. As the stabilizer, propylene glycol, ascorbic acid and the like can be used. As the preservative, phenol, benzalkonium chloride, benzyl alcohol, chlorobutanol, methylparaben and the like can be used. As the antiseptic, benzalkonium chloride, p-hydroxybenzoic acid, chlorobutanol and the like can be used.

3. Production Method of Optically Active Compound of the Present Invention

According to the present invention, a method for producing an optically active compound represented by the following formula (IV), including reacting the carbonyl reductase of the present invention with a carbonyl group-containing compound selected from the group consisting of the compounds represented by the following formulas (I), (II) and (III):

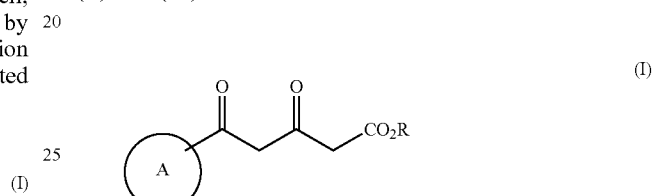

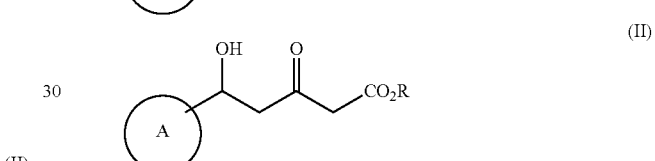

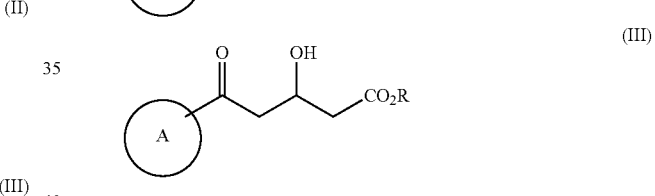

to produce an optically active compound represented by the following formula (IV):

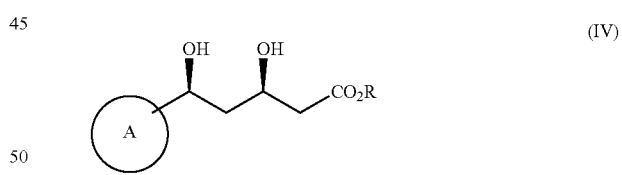

is provided.

In addition, the carbonyl group-containing compounds represented by the aforementioned formula (II) and the aforementioned formula (III) are respectively preferably an optically active form represented by the following formula (II') and the following formula (III'):

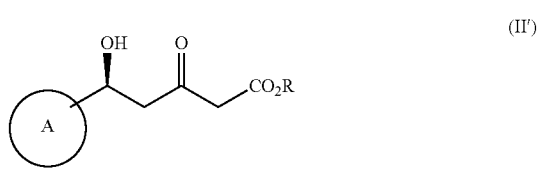

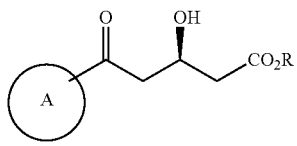

(III')

In the present specification, R is a hydrogen atom, an alkyl group, or an aryl group. The alkyl group is preferably a straight chain or branched alkyl group having 1 to 8 carbon atoms, further preferably a straight chain alkyl group having 1 to 4 carbon atoms, particularly preferably an ethyl group or an n-propyl group.

Substituent A is a substituent having an aromatic ring and/or a heterocycle. Specifically, as the substituent A, a substituent having an aromatic ring having a fluorine atom as a substituent, a substituent having a heterocycle having a nitrogen atom, and/or a substituent having a naphthalene ring are/is preferred. Among these,

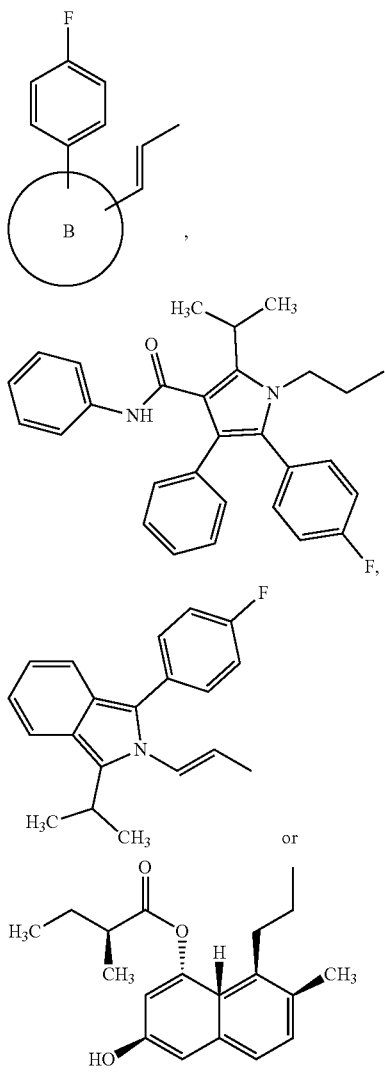

is preferred, and

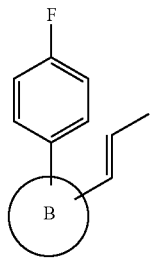

is particularly preferred.

As used herein, the substituent B is a substituent having an aromatic ring and/or a heterocycle. Specifically, as the substituent B, a substituent with a heterocycle having a nitrogen atom is preferred, and

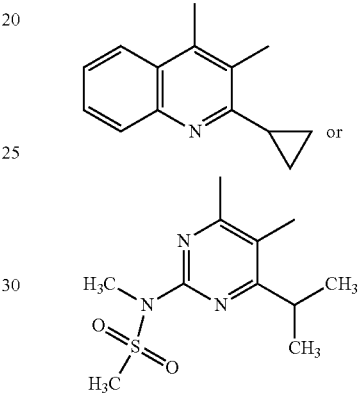

is particularly preferred.

In the present invention, substituent A is particularly preferably

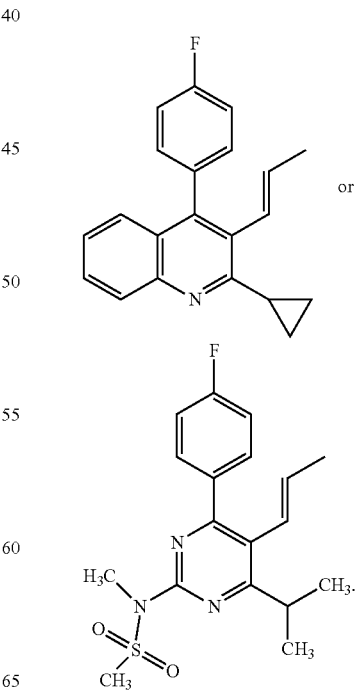

When the carbonyl reductase of the present invention is contacted with the above-mentioned carbonyl group-containing compound represented by the formula (I), (II) or (III), the purified or crude carbonyl reductase of the present invention, a microorganism or cell having the ability to produce the carbonyl reductase of the present invention (e.g., transformant having DNA encoding the polypeptide of the present invention, etc.), a processed product of the microorganism or cell, and/or a culture solution containing the enzyme obtained by culturing the microorganism or cell are/is contacted with the above-mentioned carbonyl group-containing compound represented by the formula (I), (II) or (III), whereby the above-mentioned optically active compound represented by formula (IV) can be produced.

The carbonyl reductase of the present invention may be directly used for the reaction. Use of a microorganism or cell having the ability to produce the enzyme, a processed product of the microorganism or cell, and/or a culture solution containing the enzyme obtained by culturing the microorganism or cell is preferable. Among these, use of a transformant having DNA encoding the polypeptide of the present invention is preferable.

As the amount of the microorganism or cell to be added to the reaction mixture, a processed product of the microorganism or cell, and/or a culture solution containing the enzyme obtained by culturing the microorganism or cell can be appropriately selected according to the carbonyl group-containing compound to be the substrate. For example, when the microorganism or cell is added, it is added such that the concentration of the microorganism or cell in the reaction mixture is generally about 0.1 w/v %-50 w/v %, preferably 1 w/v %-20 w/v %, in wet fungal/bacterial weight. When a processed product and a culture solution are used, the specific activity of the enzyme is determined, and they are added to achieve the above-mentioned cell concentration. As used herein, w/v % means weight/volume %.

In addition, the carbonyl reductase to be added to a reaction mixture, a microorganism or cell having the ability to produce the enzyme, a processed product of the microorganism or cell, and/or a culture medium containing the enzyme obtained by culturing the microorganism or cell is superior in the handling property, and easily added to a reaction system, it can also be used in a frozen state. When it is used in a frozen state, the shape thereof is not particularly limited and, for example, prismatic, cylindrical, bulk, spherical shape, or the like can be employed.

The method for the reaction is not particularly limited, and a carbonyl group-containing compound to be the substrate is added to a liquid containing the carbonyl reductase of the present invention and the reaction can be performed at a suitable temperature and a suitable pressure (for example, around atmospheric pressure). In this way, the above-mentioned optically active compound represented by the formula (IV) can be produced.

The amount of the carbonyl group-containing compound to be the reaction substrate can be appropriately selected according to the kind of the compound. For example, the carbonyl group-containing compound to be the reaction substrate can be used in a range of substrate concentration of 0.01 w/v % to 90 w/v %, preferably 0.1 w/v % to 30 w/v %.

A reaction substrate may be added at once at the start of the reaction. When the enzyme is inhibited by the substrate, the enzyme is desirably added continuously or intermittently to reduce the influence thereof or improve accumulation concentration of the resultant product.

The reaction medium can be appropriately selected according to the kind of the carbonyl group-containing compound to be the reaction substrate. For example, an aqueous medium or a mixture of an aqueous medium and an organic solvent can be used. Examples of the aqueous medium include water and buffer. As the organic solvent, one showing high solubility of the carbonyl group-containing compound which is the reaction substrate, such as methanol, ethanol, 1-propanol, 2-propanol, 1-butanol, tert-butanol, acetone, dimethyl sulfoxide and the like can be used. As the organic solvent, ethyl acetate, butyl acetate, toluene, chloroform, n-hexane and the like which are effective for removing reaction by-products and the like can also be used.

The reaction temperature, the pH during the reaction, and the reaction time can be appropriately selected according to the kind of the carbonyl group-containing compound to be the reaction substrate. For example, the reaction temperature is 4° C. to 80° C., preferably 10° C. to 70° C., the pH during the reaction is pH 3 to 11, preferably pH 4 to 8, and the reaction time is about 0.5 hr to 72 hr.

After completion of the reaction, the optically active compound represented by the above-mentioned formula (IV) which is produced by the production method of the present invention can be separated by a separation or purification method known to those of ordinary skill in the art, such as centrifugation, membrane treatment, or the like of fungus/bacterium, protein and the like in the reaction mixture, and thereafter can be purified by appropriately combining extraction with organic solvents, distillation, column chromatography using ion exchange resin, silica gel, etc., crystallization at the isoelectric point, crystallization with monohydrochloride, dihydrochloride, calcium salt, etc., and the like.

Furthermore, the present invention relates to a method for producing an optically active compound by reacting a transformant cell of the present invention, a culture of the transformant cell, or a processed product of the transformant cell, which is obtained by the above-mentioned method and the like, with a carbonyl group-containing compound represented by the following formula (I), (II) or (III) serving as a reaction substrate so as to perform an asymmetric reduction of the carbonyl group of the compound. Any of the transformant cell, a culture of the transformant cell, and a processed product of the transformant cell can be used alone or in combination.

Particularly, the production method of the present invention can be preferably used particularly when the substituent A is

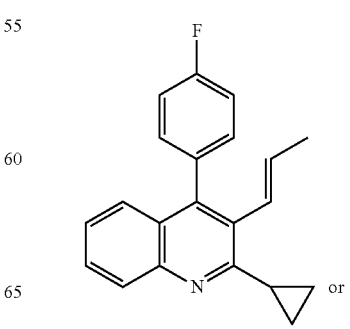

or

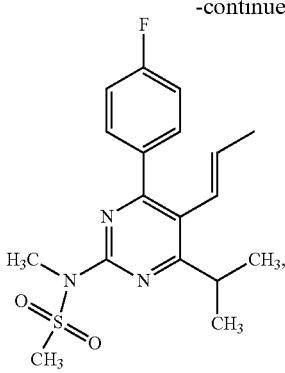

that is, for the production of pitavastatin or rosuvastatin.
(1) In the Case of Pitavastatin As the production method of pitavastatin, the methods described in JP-B-4270918, WO 2017/022846, and the like can be mentioned.

A carbonyl group-containing compound represented by the following formula (I'), (II") or (III")

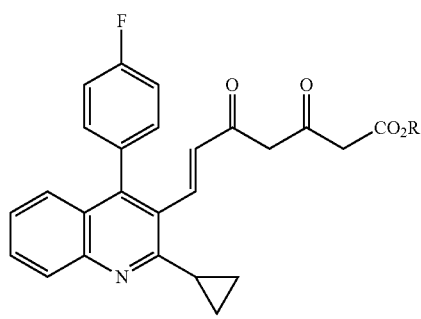

(I')

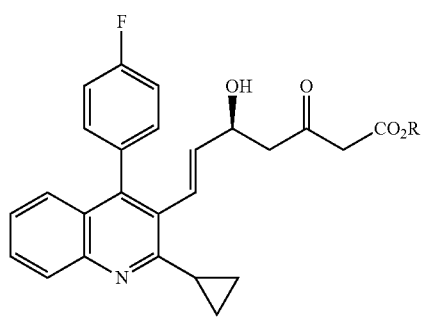

(II")

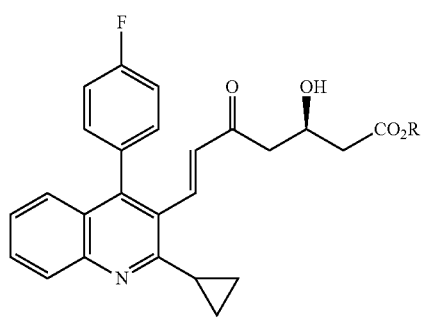

(III")

to be the reaction substrate can be freely produced by combining the methods described in JP-A-H01-279866, JP-A-H08-127585, JP-A-H05-178841, WO 2017/022846, and the like and a known method. One kind or a combination of two or more kinds of these compounds can be used as a starting material.

When a compound represented by the formula (I') is used as a reaction substrate, a compound represented by the formula (II") may be used as a production intermediate therefor, or a compound represented by the formula (III") may be used as a production intermediate therefor. Thus, a compound represented by the formula (II") and a compound represented by the formula (III") may be produced in advance from a compound represented by the formula (I'), and isolated and further led to an optically active compound represented by the formula (IV')

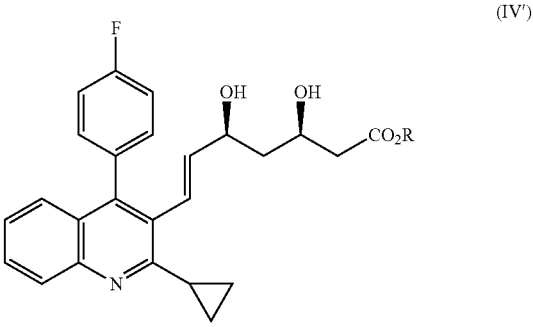

(IV')

or a compound represented by the formula (IV') may be directly produced without isolating a compound represented by the formula (II") and a compound represented by the formula (III").

A carbonyl group-containing compound represented by the formula (I'), (II"), or (III") to be a reactant is generally used at a range of substrate concentration of 0.01 w/v %-20 w/v %, preferably 0.1 w/v %-10 w/v %. A reactant may be present in the reaction system in advance, or added at once at the start of the reaction. When the substrate is inhibited by the enzyme, the enzyme can also be added continuously or intermittently from the start of the reaction to reduce the influence thereof or improve accumulation concentration of the resultant product.

In addition, the reaction is preferably performed in the presence of coenzyme $NAD(P)^+$ or $NAD(P)H$. In this case, the above-mentioned coenzyme is preferably added at a concentration of generally 0.001 mmol/L-100 mmol/L, preferably 0.01 mmol/L-10 mmol/L.

When the above-mentioned coenzyme is added, regeneration of $NAD(P)^+$ produced from $NAD(P)H$ into $NAD(P)H$ in the reaction system is preferable in view of reaction efficiency. Examples of the regeneration method include 1) a method utilizing an ability to generate $NAD(P)H$ from $NAD(P)^+$ of the microorganism or cell itself of the present invention, i.e., $NAD(P)^+$ reduction ability, 2) a method comprising addition of one or more kinds from a microorganism or a processed product thereof having an ability to generate $NAD(P)H$ from $NAD(P)^+$, or an enzyme utilizable for regeneration of $NAD(P)H$ such as glucose dehydrogenase, formate dehydrogenase, alcohol dehydrogenase, amino acid dehydrogenase, organic acid dehydrogenase (malic acid dehydrogenase and the like) and the like (hereinafter to be referred to as "regenerating enzyme") to a reaction system, 3) a method comprising concurrent introduction of one or more kinds of the above-mentioned regenerating enzyme gene into a host organism or host cell when producing the microorganism or cell of the present invention, and the like.

In the above-mentioned method of 1), glucose, ethanol, 2-propanol or formic acid and the like are preferably added to the reaction system from the aspect of production efficiency.

In the above-mentioned method of 2), a microorganism having the ability to produce the above-mentioned regenerating enzyme, a processed product of microorganism such as the microorganism treated with acetone, glutaraldehyde-treated, or freeze-dry treated, physically or enzymatically disrupted microorganism and the like, the enzyme fraction obtained as a crude product or purified product, and further, these after immobilization on a carriers such as polyacrylamide gel, carageenan gel and the like, and the like may be used, or a commercially available enzyme may also be used.

The amount of the above-mentioned regenerating enzyme to be used is preferably such amount that renders the enzyme activity generally 0.01-fold to 100-fold, preferably about 0.5-fold to 20-fold, as compared to the carbonyl reduction activity of the enzyme of the present invention having an ability to stereoselectively reduce a carbonyl group.

While addition of a compound to be the substrate of the above-mentioned regenerating enzyme, for example, glucose when glucose dehydrogenase is utilized, formic acid when formate dehydrogenase is utilized, ethanol or isopropanol when alcohol dehydrogenase is utilized and the like, is also necessary, the amount thereof to be added is generally 0.1 mol-20 mol, preferably 1 mol-10 mol, relative to 1 mol of a carbonyl group-containing compound serving as a reaction substrate.

In the method of the above-mentioned 3), a method for incorporating a DNA of the above-mentioned regenerating enzyme into chromosome along with a DNA encoding the enzyme used in step (i), a method for introducing both DNAs into a single expression vector and transforming a host organism or cell, or a method for introducing both DNAs into separate expression vectors and transforming a host organism or cell and the like can be used. In the method for introducing both DNAs into separate expression vectors, and transforming a host organism or cell, an expression vector needs to be selected in consideration of the incompatibility between both expression vectors.

When plural genes are introduced into a single expression vector, a method of connecting regions involved in the control of expression such as a promoter and a terminator and the like to each gene, and method of enabling expression as an operon containing multiple cistrons such as lactose operon are also possible.

The reaction is performed in an aqueous medium or a mixture of an aqueous medium and an organic solvent. The aqueous medium or a mixture of an aqueous medium and an organic solvent contains a carbonyl group-containing compound serving as a reaction substrate and the above-mentioned enzyme, a microorganism or cell having the ability to produce the enzyme, a processed product of the microorganism or cell, and/or a culture medium containing the enzyme obtained by culturing the microorganism or cell. In addition, where necessary, various coenzymes may be contained. When a coenzyme is contained, a regenerating system thereof is more preferred, that is, a system that can regenerate the coenzyme is more preferred.

The carbonyl group-containing compound serving as a reaction substrate can also be produced by the below-mentioned method.

As the aqueous medium, water and pH buffers such as potassium phosphate buffer, sodium citrate buffer, Tris-HCl buffer and the like can be mentioned.

As the organic solvent, a solvent in which a carbonyl group-containing compound serving as a reaction substrate shows high solubility, such as ethyl acetate, isopropyl acetate, butyl acetate, toluene, chloroform, n-hexane, n-heptane, dimethyl sulfoxide, methanol, ethanol, n-propanol, 2-propanol and the like, can be used. Of these, dimethyl sulfoxide, methanol, and ethanol are each preferable as an organic solvent, since a carbonyl group-containing compound serving as a reaction substrate shows high solubility therein. Furthermore, dimethyl sulfoxide is more preferable since conversion ratio is high.

The reaction is generally performed at a reaction temperature of 4° C.-70° C., preferably 30° C.-60° C., generally at pH 3-11, preferably pH 4-8. The reaction time is generally 0.5 hr-48 hr, preferably 0.5 hr-24 hr.

The obtained compound represented by the formula (IV') can be purified by separating fungal/bacterial cells, polypeptide and the like by centrifugation, filtration and the like, adjusting to a suitable pH, and applying an appropriate combination of extraction with an organic solvent such as hexane, ethyl acetate, toluene and the like, and purification by column chromatography, crystallization and the like.

For example, for the reaction of the following formulas, a carbonyl reductase containing one or more, preferably 2 or more, mutations of (d), (e) or (f) in the amino acid sequence shown in SEQ ID NO: 1 or a homologue of the amino acid sequence, and having carbonyl reductase activity can be preferably used. In addition, it may further have mutation of (g). Particularly, one having at least mutation of (d) is preferable for the reaction of the following formulas.

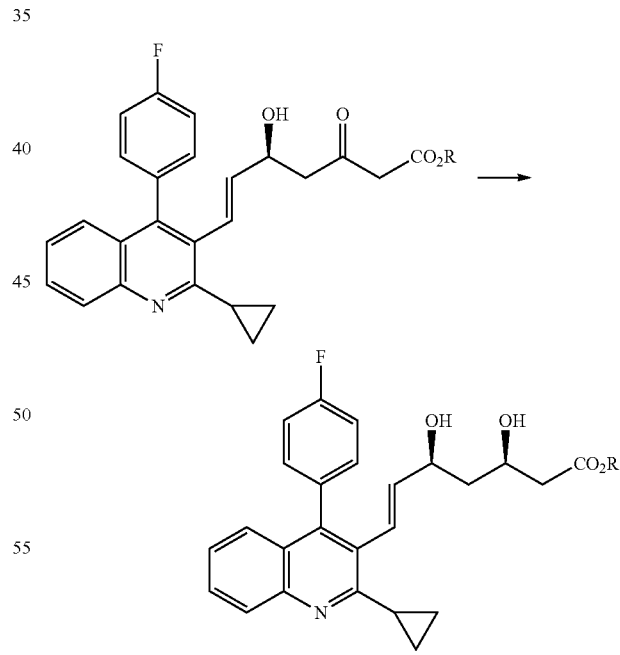

For example, for the reaction of the following formulas, a carbonyl reductase containing one or more, preferably 2 or more, particularly preferably 3 or more, mutations of (a), (b), (c), (e) and (f) in the amino acid sequence shown in SEQ ID NO: 1 or a homologue of the amino acid sequence, and having carbonyl reductase activity can be preferably used. In addition, it may further have mutation of (g). Particularly, one having mutations (b), (e) and (f) is preferable for the reaction of the following formulas.

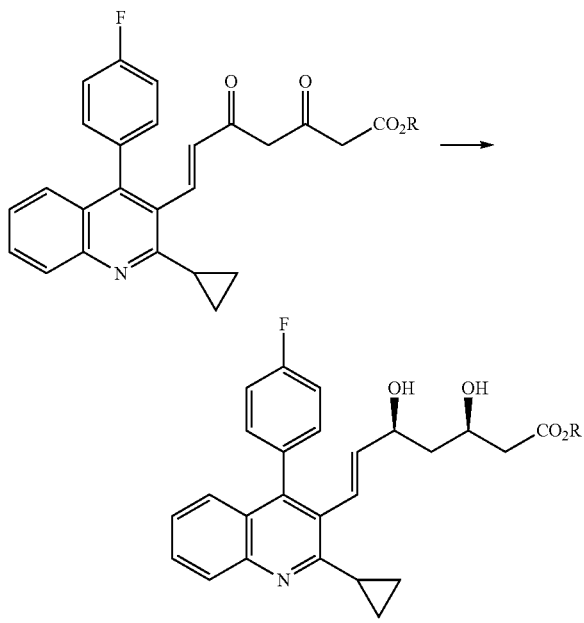

(1) In the Case of Rosuvastatin

As the production method of rosuvastatin, the methods described in WO 2015/119261 and the like can be mentioned.

As the reaction substrate, for example, a carbonyl group-containing compound represented by the following formula (I″) can be used.

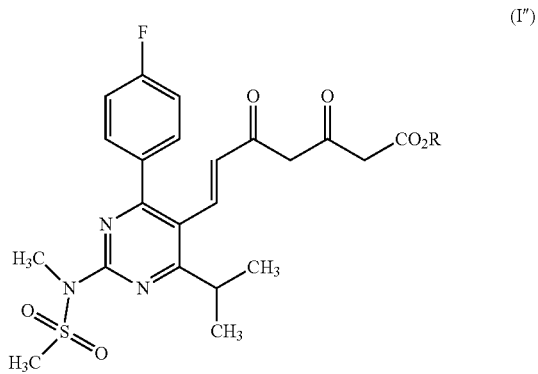

A carbonyl group-containing compound represented by the formula (I″) to be the reaction substrate is generally used at a range of substrate concentration within the range of 0.01 w/v %-20 w/v %, preferably 0.1 w/v %-10 w/v %. The reaction substrate may be added all at once at the start of the reaction. However, it can also be added continuously or intermittently from the viewpoint of reducing the influence of the substrate inhibition against the enzyme and improving the accumulated concentration of the resultant product.

The reaction is preferably performed in the presence of coenzyme $NAD(P)^+$ or $NAD(P)H$. In this case, the above-mentioned coenzyme is added to achieve a concentration of generally 0.001 mmol/L-100 mmol/L, preferably 0.01 mmol/L-10 mmol/L.

When the above-mentioned coenzyme is added, it is preferable to regenerate $NAD(P)^+$ generated from $NAD(P)H$ into $NAD(P)H$ in the reaction system to improve production efficiency. Examples of the regeneration method include 1) a method utilizing an ability to generate $NAD(P)H$ from $NAD(P)^+$ of the microorganism or cell itself in the present invention, i.e., $NAD(P)^+$ reduction ability, 2) a method of adding not less than one kind of a microorganism having the ability to generate $NAD(P)H$ from $NAD(P)^+$, or a processed product thereof, or an enzyme (hereinafter to be referred to as "regenerating enzyme") that can be used for regeneration of $NAD(P)H$, such as glucose dehydrogenase, formate dehydrogenase, alcohol dehydrogenase, amino acid dehydrogenase, organic acid dehydrogenase (malate dehydrogenase, etc.), into the reaction system, 3) a method comprising concurrent introduction of one or more kinds of the above-mentioned regenerating enzyme gene into a host organism or host cell when producing the microorganism or cell in the present invention, and the like.

In the above-mentioned method of 1), glucose, ethanol, 2-propanol or formic acid and the like are preferably added to the reaction system.

In the above-mentioned method of 2), a microorganism having the ability to produce the above-mentioned regenerating enzyme, a processed product of microorganism such as the microorganism treated with acetone or freeze-dry treated, physically or enzymatically disrupted microorganism and the like, the enzyme fraction obtained as a crude product or purified product, and further, these after immobilization on a carrier such as polyacrylamide gel, carageenan gel and the like, and the like may be used, or a commercially available enzyme may also be used.

In this case, the amount of the above-mentioned regenerating enzyme to be used is such amount that renders the enzyme activity generally 0.01-fold to 100-fold, preferably about 0.5-fold to 20-fold, as compared to the carbonyl reduction activity of the enzyme of the present invention having an ability to stereoselectively reduce a carbonyl group.

While addition of a compound to be the substrate of the above-mentioned regenerating enzyme, for example, glucose when glucose dehydrogenase is utilized, formic acid when formate dehydrogenase is utilized, ethanol or isopropanol when alcohol dehydrogenase is utilized and the like, is also necessary, the amount thereof to be added is generally 0.1 equivalent-20 equivalents, preferably 1 equivalent-10 equivalents, relative to a carbonyl group-containing compound represented by the formula (I″) which is a reaction substrate.

In the method of the above-mentioned 3), a method for incorporating a DNA of the above-mentioned regenerating enzyme into chromosome along with a DNA encoding the carbonyl reductase of the present invention, a method for introducing both DNAs into a single expression vector and transforming a host organism or cell, or a method for introducing both DNAs into separate expression vectors, and transforming a host organism or cell can be used. In the method for introducing both DNAs into separate expression vectors, and transforming a host organism or cell, an expression vector needs to be selected in consideration of the incompatibility between both expression vectors.

When plural genes are introduced into a single expression vector, a method of connecting regions involved in the control of expression such as a promoter and a terminator and the like to each gene, as well as expression as an operon containing multiple cistrons like lactose operon are also possible.

The reaction is performed in an aqueous medium or a mixture of the aqueous medium and an organic solvent, which contains a carbonyl group-containing compound represented by the formula (I") and the above-mentioned enzyme, a microorganism or cell having the ability to produce the enzyme, a processed product of the microorganism or cell, and/or a culture medium containing the enzyme obtained by culturing the microorganism or cell and, where necessary, various coenzymes (a regenerating system thereof, i.e., it is more preferable that the coenzyme can be regenerated). A carbonyl group-containing compound represented by the formula (I") can be produced by the method described in WO 2015/119261, and the like.

As the aqueous medium, water and buffers such as potassium phosphate buffer, sodium citrate buffer, Tris-HCl buffer and the like can be mentioned.

As the organic solvent, a solvent in which a carbonyl group-containing compound represented by the formula (I") shows high solubility, such as ethyl acetate, isopropyl acetate, butyl acetate, toluene, chloroform, n-hexane, n-heptane, dimethyl sulfoxide, methanol, ethanol, n-propanol, 2-propanol and the like can be used. Of these, dimethyl sulfoxide, methanol, ethanol are preferable as an organic solvent, since a compound represented by the formula (I") shows high solubility. Furthermore, dimethyl sulfoxide is more preferable since conversion ratio is high.

The reaction can also be performed in the presence of polyhydric alcohol such as glycerol, ethylene glycol, propylene glycol, erythritol, inositol, sorbitol, xylitol and the like. The aforementioned polyhydric alcohol may be a polymer or derivative, and one kind thereof may be used or a mixture of two or more kinds thereof can also be used. When the reaction is performed in the presence of polyhydric alcohol, the conversion ratio tends to be improved. Among those, glycerol is preferable since it is assumed to maintain enzymatic activity by retaining conformation of the enzyme, and is easily available.

The reaction is generally performed at a reaction temperature of 4° C.-70° C., preferably 20° C.-60° C., generally at pH 3-11, preferably pH 4-8. The reaction time is generally 0.5 hr-48 hr, preferably 0.5 hr-24 hr. It can also be performed utilizing a membrane reactor and the like.

The obtained optically active compound represented by the formula (VI"):

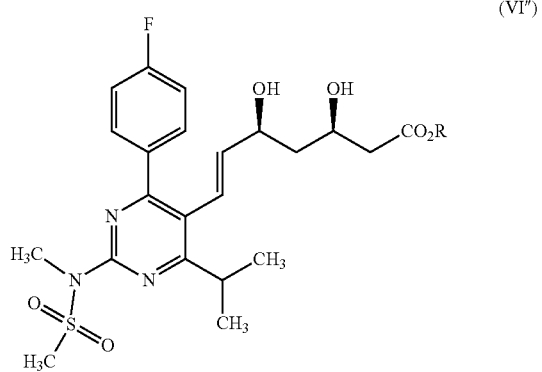

can be purified by separating fungal/bacterial cells, polypeptide and the like by centrifugation, filtration and the like, adjusting to a suitable pH, applying an appropriate combination of extraction with an organic solvent such as hexane, ethyl acetate, toluene and the like, and purification by column chromatography, crystallization and the like.

When an optically active compound represented by the formula (VI") is purified by crystallization, as an organic solvent that can be used, a solvent in which an optically active compound represented by the formula (VI") shows high solubility, for example, hydrocarbon solvents such as cyclohexane, n-hexane, n-heptane, toluene and the like, halogenated solvents such as chlorobenzene, dichlorobenzene and the like, ether solvents such as tert-butyl methyl ether, tetrahydrofuran (THF), cyclopentyl methyl ether (CPME) and the like, alcoholic solvents such as methanol, ethanol, n-propanol, isopropanol and the like, polar solvents such as N-methyl-2-pyrrolidone, N,N-dimethylformamide, N,N-dimethylacetamide, dimethyl sulfoxide and the like, and the like can be used. These organic solvents can be used singly, and a mixed solvent of these organic solvents and water can also be used.

When an optically active compound represented by the formula (VI") is purified by crystallization, a crystal of the aforementioned optically active compound represented by the formula (VI") is preferably precipitated by dissolving an optically active compound represented by the formula (VI") in an organic solvent, or a mixed solvent of an organic solvent and water, and then cooling same at a cooling rate of 15° C./hr or below (this step of crystal precipitation by cooling is hereinafter to be referred to as a "cooling step").

In the cooling step, a temperature at which cooling is started is preferably 15° C.-60° C., more preferably 20° C.-55° C.

The cooling rate in the cooling step is preferably not more than 15° C./hr, more preferably not more than 9° C./hr, further preferably not more than 6° C./hr, particularly preferably not more than 5° C./hr. In this way, the purity of the obtained optically active compound represented by the formula (VI") can be increased.

The cooling rate can be changed during the cooling step. Particularly, slow cooling is preferable within a temperature range of preferably not more than 45° C., more preferably not more than 40° C. To be specific, the cooling rate is more preferably 9° C./hr, further preferably not more than 6° C./hr, particularly preferably not more than 5° C./hr.

For example, for the reaction of the following formulas, a carbonyl reductase containing an amino acid sequence containing at least one, preferably 2 or more, particularly preferably 3 or more, mutations from (a), (b), (c), (e) and (f) in the amino acid sequence shown in SEQ ID NO: 1 or a homologue of the amino acid sequence, and having carbonyl reductase activity can be preferably used. In addition, it may further have mutation of (g). Particularly, one having mutations (b), (e) and (f) is preferable for the reaction of the following formulas.

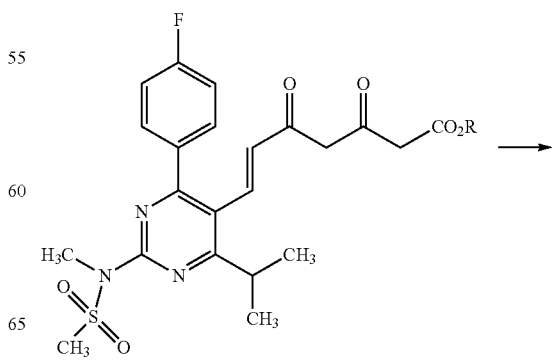

-continued

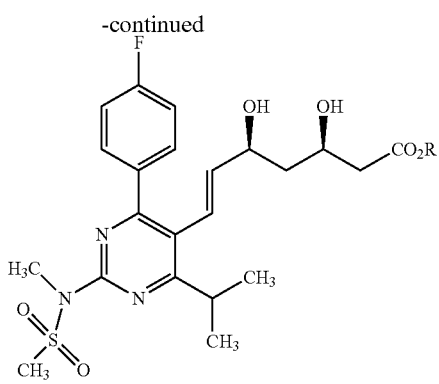

EXAMPLE

The present invention is further explained in detail in the following by referring to Examples; however, the present invention is not limited by the Examples.

The quantitative analysis in the Examples included measurement under the following conditions by using HPLC (High Performans Liquid Chromatography).

<Measurement Condition 1>
  column: Cosmosil 3C18MS-II (4.6×75 mm, 3 µm) manufactured by Nacalai
  mobile phase: methanol/acetonitrile/water/phosphoric acid=300/150/450/1
  flow rate: 0.5 mL/min column temperature: 50° C.
  detection wavelength: UV 245 nm
  injection volume: 5 µL <Measurement Condition 2>
  column: CAPCELL PAK C18 MGIII (4.6×75 mm, 3 µm) manufactured by SHISEIDO
  mobile phase: A:100 mM HCOONH4 B: ethanol
  gradient program (B concentration): 45% (0 min)→45% (20 min)→80% (30 min)→80% (35 min)
  flow rate: 0.55 mL/min column temperature: 40° C.
  detection wavelength: UV 245 nm
  injection volume: 5 µL <Measurement Condition 3>
  column: ACQUITY UPLC BEH C18 (2.1×100 mm, 1.7 µm)
  mobile phase: A: 0.1% formic acid aqueous solution B: 0.1% formic acid-containing acetonitrile solution
  gradient program (B concentration): 40% (0 min)→95% (12 min)→64% (14 min)→40% (17 min)
  flow rate: 0.3 mL/min column temperature: 40° C.
  detection wavelength: UV 245 nm
  injection volume: 5 µL <Measurement Condition 4>
  column: CAPCELL PAK C18 MGS-III (4.6×75 mm, 3 µm) manufactured by SHISEIDO
  mobile phase: water/acetic acid/ammonium acetate=1000/100/7.7 (volume/volume/weight)
  flow rate: 1 mL/min column temperature: 40° C.
  detection wavelength: UV 254 nm
  injection volume: 5 µL Reference Example 1 (Preparation of Bacterial Cells)

(1) Gene Cloning

The gene was cloned by reference to Patent Literature 1 (JP-B-4270918). Based on gene sequence ocr1 (SEQ ID NO: 2) encoding OCR1 (SEQ ID NO: 1) derived from *Ogataea minuta* var. *nonfermentans* NBRC 1473, PCR was performed according to a conventional method to obtain a DNA fragment having a total length of about 0.8 kbp and containing the restriction enzyme site EcoRI at the upstream of the ocr1 gene and the restriction enzyme site XbaI at the downstream thereof.

Then, by reference to Patent Literature 2 (WO 2015/119261) and based on the gene sequence (hereinafter gdh (SEQ ID NO: 4)) encoding GDH (SEQ ID NO: 3) obtained by substituting the 96th amino acid residue glutamic acid by alanine in glucose-1-dehydrogenase encoded by the gene (GeneBank Accession No. AL009126.3) derived from *Bacillus subtilis*, PCR was performed according to a conventional method to obtain a DNA fragment having a total length of about 0.8 kbp and containing the restriction enzyme site EcoRI at the upstream of the gdh gene and the restriction enzyme site XbaI at the downstream thereof.

(2) preparation of Expression Plasmid

The DNA fragment of ocr1 obtained in the above-mentioned (1) was digested with restriction enzymes EcoRI and XbaI, and introduced into plasmid pKV32, which is described in JP-A-2005-34025 and digested with MunI and XbaI, at the downstream of trc promoter by using Ligation-Convenience Kit (manufactured by NIPPON GENE) to obtain pKV32OCR1.

Then, the DNA fragment of gdh obtained in the above-mentioned (1) was digested with restriction enzymes EcoRI and XbaI, and introduced into plasmid pKV32 digested with MunI and XbaI, at the downstream of trc promoter by using Ligation-Convenience Kit (manufactured by NIPPON GENE) to obtain pKV32GDH.

Furthermore, PCR was performed according to a conventional method using pKV32GDH as a template to obtain a DNA fragment having a total length of about 0.8 kbp and having the restriction enzyme site HindIII added to the upstream and the downstream. The obtained DNA fragment was digested with the restriction enzyme HindIII, inserted into the downstream of plasmid pKV32OCR1 previously digested with the restriction enzyme HindIII to obtain pKV32OCR1-GDH. The orientation of the gdh gene in the obtained plasmid was confirmed by PCR.

(3) Preparation of Plasmid for OCR1 Variant Expression

Using the plasmid pKV32OCR1-GDH obtained in the above-mentioned (2) as a template, and, for example, using a site-directed mutagenesis method such as QuikChange Site-Directed Mutagenesis Kit (manufactured by Agilent Technologies, Inc.), a variant plasmid capable of expressing the variants shown in the following Table 1 was prepared according to a conventional method.

In the following Table, A is alanine, N is asparagine, D is aspartic acid, I is isoleucine, L is leucine, M is methionine, S is serine, and V is valine. In addition, for example, I211A indicates a mutation in which the 211th isoleucine is substituted by alanine in the amino acid sequence shown in SEQ ID NO: 1.

TABLE 1

| SEQ ID NO | variant list | position of amino acid residue | | | | | | |
|---|---|---|---|---|---|---|---|---|
| | | 54 | 157 | 166 | 170 | 211 | 214 | 249 |
| 1 | OCR1 wild type | D | M | V | A | I | M | M |
| 5 | D54V | V | M | V | A | I | M | M |
| 6 | V166A | D | M | A | A | I | M | M |
| 7 | A170S | D | M | V | S | I | M | M |

TABLE 1-continued

| SEQ ID NO | variant list | position of amino acid residue | | | | | | |
|---|---|---|---|---|---|---|---|---|
| | | 54 | 157 | 166 | 170 | 211 | 214 | 249 |
| 8 | I211N | D | M | V | A | N | M | M |
| 9 | I211A | D | M | V | A | A | M | M |
| 10 | M249L | D | M | V | A | I | M | L |
| 11 | A170S/M249L | D | M | V | S | I | M | L |
| 12 | V166A/M249L | D | M | A | A | I | M | L |
| 13 | M157V/A170S/M249L | D | V | V | S | I | M | L |
| 14 | V166A/A17S/M249L | D | M | A | S | I | M | L |
| 15 | V166A/M214L/M249L | D | M | A | A | I | L | L |
| 16 | A170S/I211A/M249L | D | M | V | S | A | M | L |
| 17 | A170S/M214L/M249L | D | M | V | S | I | L | L |
| 18 | M157V/V166A/M214L/M249L | D | V | A | A | I | L | L |
| 19 | M157V/A170S/M214L/M249L | D | V | V | S | I | L | L |
| 20 | V166A/A170S/M214L/M249L | D | M | A | S | I | L | L |
| 21 | D54V/M157V/A170S/M214L/M249L | V | V | V | S | I | L | L |
| 22 | M157V/V166A/A170S/M214L/M249L | D | V | A | S | I | L | L |

Here, D54V is a mutation of (a), M157V is a mutation of (b), A170S is a mutation of (c), I211A and I211N are mutations of (d), M214L is a mutation of (e), M249L is a mutation of (f) and V166A is a mutation of (g).

Example 1 (Preparation of Expression Strain)

Using the plasmid pKV32OCR1-GDH and its variant plasmid obtained in the above-mentioned Reference Example 1, (2) and (3), *Escherichia coli* JM109 (manufactured by Takara Bio Inc.) was transformed according to a conventional method to obtain respective transformants.

Example 2

5S-MOLE was reduced by reaction with the transformant obtained in Example 1 to produce DOLE. The ratio of the obtained syn-isomer and anti-isomer of DOLE was measured, and the optical selectivity was evaluated.

Here, 5S-MOLE, syn-DOLE, and anti-DOLE are respectively the compounds having the following structures.

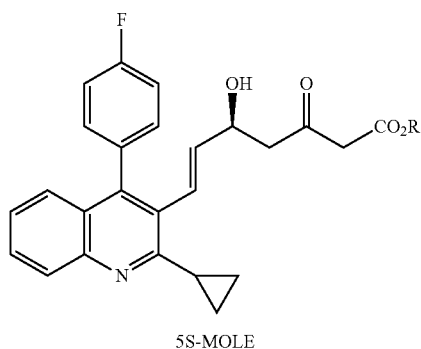

5S-MOLE

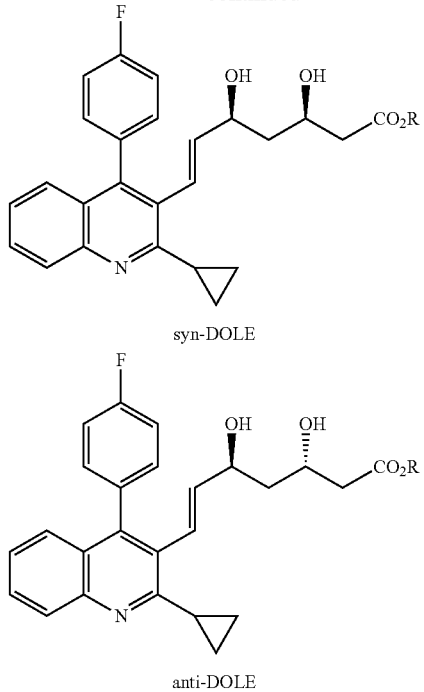

syn-DOLE anti-DOLE

The following reactions and evaluations were performed with respect to the transformants having each of OCR1 and the mutations shown in Table 2.

The transformant was inoculated into an LB liquid medium containing kanamycin at a concentration of 25 mg/L and Isopropyl-β-D-thiogalactopyranoside (hereinafter referred to as "IPTG") at a concentration of 0.2 mmol/L, and incubated with shaking at 37° C. overnight. The bacterial cells were collected from the obtained culture medium, potassium phosphate buffer (pH 6, 200 μL) at a concentration of 100 mmol/L, NADP$^+$ (30 μL) at a concentration of 2 g/L, and toluene (1 μL) were added, and the mixture was shaken vigorously for 5 min. Then, glucose (10 μL) at a concentration of 50 wt % and 5S-MOLE (10 μL) at a concentration of 5 g/L were added, and the mixture was reacted by shaking at 45° C. for 1 hr.

To the obtained reaction mixture was added acetonitrile (750 μL), and the mixture was centrifuged. The obtained centrifugal supernatant was analyzed by HPLC under measurement condition 2 and measurement condition 1. The anti-isomer rates of respective transformants are shown in Table 2.

The anti-isomer rate was calculated from the ratio of syn-DOLE and anti-DOLE obtained by HPLC analysis and by the following calculation formula.

anti-isomer rate (%)=amount of produced anti-DOLE/amount of produced syn-DOLE×100

TABLE 2

| SEQ ID NO | mutation | anti-isomer rate |
|---|---|---|
| 1 | none (OCR1) | 1.1% |
| 8 | I211A | 0.5% |
| 9 | I211N | 0.4% |

As is clear from Table 2, those having the I211A or I211N mutation showed decreased anti-isomer rates as compared with OCR1. That is, it was found that the mutation of (d) (I211A or I211N) improves optical selectivity.

Example 3

DOXE was reduced by reaction with the transformant obtained in Example 1, and the reaction activity and stereoselectivity were evaluated from the obtained amounts of produced 3R-MOLE, 5S-MOLE, and DOLE.

Here, DOXE, 3R-MOLE, 5S-MOLE, and DOLE are respectively the compounds having the following structures.

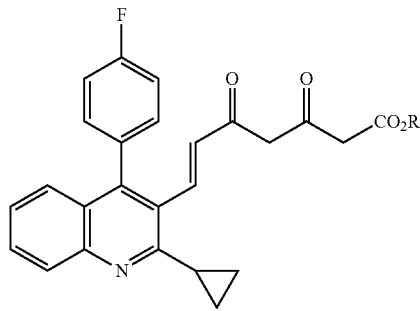

DOXE

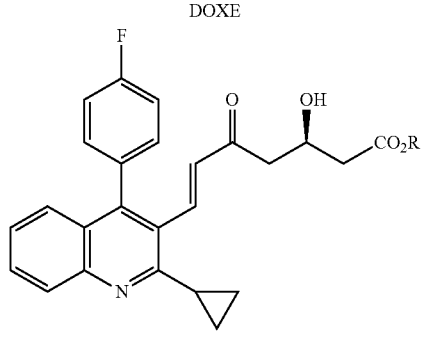

3R-MOLE

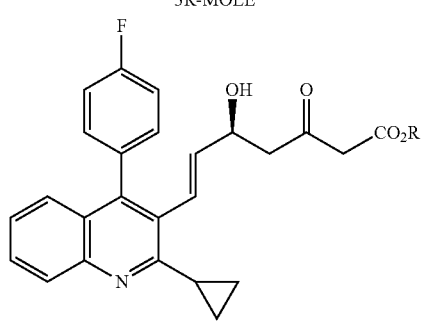

5S-MOLE

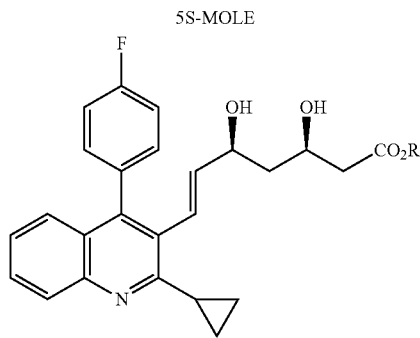

DOLE

The following reactions and evaluations were performed with respect t the transformants having o each of OCR1 and the mutations shown in Table 3.

The transformants were inoculated into LB liquid medium containing kanamycin at a concentration of 25 mg/L and IPTG at a concentration of 0.2 mmol/L, and cultured with shaking at 37° C. overnight. The bacterial cells were recovered from the obtained culture medium, and suspended in a potassium phosphate buffer having a concentration of 100 mmol/L. A container containing the suspension was immersed in ice water, and an ultrasonic disruption treatment was performed. The obtained bacterial cell lysate was centrifuged to obtain a supernatant of bacterial cell homogenate.

To the obtained supernatant (100 µL) of the bacterial cell homogenate were added potassium phosphate buffer (pH 7, 100 µL) at a concentration of 0.2 mol/L, glucose (100 µL) at a concentration of 20 g/L, NADP$^+$ (10 µL) at a concentration of 0.2 g/L, DMSO solution (100 µL) of DOXE at a concentration of 1 g/L, and water (90 µL), and the mixture was reacted using ThermoMixer R Mixer (manufactured by Eppendorf) at 50° C., 1000 rpm for 15 min. After the reaction, acetonitrile (1 mL) was added, and the mixture was centrifuged. The obtained supernatant was analyzed by HPLC under measurement condition 3. The reaction activity of each transformant and 3R-MOLE ratio are shown in Table 3.

The reaction activity and the 3R-MOLE ratio was calculated from each peak area value obtained by HPLC analysis by the following calculation formula.

Reaction activity=5S-MOLE peak area+3R-MOLE peak area

3R-MOLE ratio=3R-MOLE peak area/5S-MOLE peak area

The reaction activity was evaluated with OCR1 as the standard, in which not more than 0.9 times is "−", 1.0 time is "+", 1.1 times is "++", and not less than 1.2 times is "+++".

The 3R-MOLE ratio was evaluated with OCR1 as the standard, in which 0.9-1.0 times is "+", 0.7-0.8 times is "++", and not more than 0.6 times is "+++".

TABLE 3

| SEQ ID NO | mutation | reaction activity | 3R-MOLE ratio |
|---|---|---|---|
| 1 | none (OCR1) | + | + |
| 11 | A170S/M249L | − | + |
| 13 | M157V/A170S/M249L | − | ++ |
| 15 | V166A/M214L/M249L | ++ | ++ |
| 17 | A170S/M214L/M249L | − | ++ |
| 18 | M157V/V166A/M214L/M249L | ++ | +++ |
| 19 | M157V/A170S/M214L/M249L | +++ | +++ |
| 20 | V166A/A170S/M214L/M249L | − | ++ |
| 22 | M157V/V166A/A170S/M214L/M249L | ++ | +++ |

As is clear from Table 3, those with the M157V or M214L mutation had a reduced 3R-MOLE ratio compared to OCR1. In particular, those having both M157V and M214L mutations not only showed reduced 3R-MOLE ratio, but also showed improved reaction activity. That is, it was found that the stereoselectivity and the reaction activity are improved by M157V (mutation of (b)) and M214L (mutation of (e)).

Example 4

The following reactions and evaluations were performed with respect to the transformants having each of OCR1 and the mutations shown in Table 4.

The transformants were inoculated into LB liquid medium containing kanamycin at a concentration of 25 mg/L and IPTG at a concentration of 0.2 mmol/L, and cultured with shaking at 37° C. overnight. The bacterial cells were recovered from the obtained culture medium, and suspended in a potassium phosphate buffer having a concentration of 100 mmol/L. A container containing the suspension was immersed in ice water, and an ultrasonic disruption treatment was performed. The obtained bacterial cell lysate was centrifuged to obtain a supernatant of disrupted bacterial cell homogenate.

The protein concentration of the obtained supernatant of the bacterial cell homogenate was measured according to a conventional method using a Quick Start Bradford protein assay kit (manufactured by BIO-RAD Laboratories).

In addition, the obtained supernatant of the disrupted bacterial cells was divided into two, one was refrigerated at 4° C.-10° C., and the other was heat-treated at 50° C., 200 rpm for 1 hr using ThermoMixer R Mixer (manufactured by Eppendorf).

Using the refrigerated or heat-treated respective supernatants of the bacterial cell homogenate, the supernatant (10 µL) of the bacterial cell homogenate, potassium phosphate buffer (pH 7) (25 µL) at a concentration of 1 mol/L, NADPH (10 µL) at a concentration of 8 mmol/L, water (200 µL), and DMSO solution (5 µL) of 2,2,2,-trifluoroacetophenone (TFAP) at a concentration of 0.1 mol/L were mixed. The mixture was placed in a 96 well plate (manufactured by Corning Incorporated), and the change in the absorbance at 340 nm was measured for 2 min using a microplate reader (manufactured by Molecular Bio). The mean (mOD/min) of the absorbance change per unit time was calculated, and the activity value per unit time, unit protein was calculated from the slope of the absorbance change by the following formula.

In addition, the protein concentration of the refrigerated or heat-treated respective supernatants of the bacterial cell homogenate was measured according to a conventional method using a Quick Start Bradford protein assay kit (manufactured by BIO-RAD Laboratories).

The molar absorption coefficient of NADPH used for the calculation was 6.3 mL/µmol·cm.

activity value(µmol/min/mg-protein)=(−1)×slope of absorbance change×250 µL/10 µL/6300/0.55/ protein concentration By applying the activity value obtained as described above to the following formula, the activity ratio before and after the heat treatment was calculated, and the thermal stability was evaluated. The thermal stability of each transformant is shown in Table 4.

thermal stability (%)=activity value upon the heat-treatment/activity value upon the refrigerated storage×100

A thermal stability value of less than 20% was evaluated as "−", the range of 20% to 70% was evaluated as "+", and a value of more than 70% was evaluated as "++".

TABLE 4

| SEQ ID NO | mutation | thermal stability |
|---|---|---|
| 1 | none (OCR1) | − |
| 6 | V166A | + |
| 7 | A170S | + |
| 10 | M249L | + |
| 11 | A170S/M249L | ++ |

TABLE 4-continued

| SEQ ID NO | mutation | thermal stability |
|---|---|---|
| 12 | V166A/M249L | ++ |
| 14 | V166A/A170S/M249L | ++ |

As is clear from Table 4, those with the A170S or M249L mutation had improved thermal stability.

In particular, those having both A170S and M249L mutations had further improved thermal stability. That is, it was found that the thermal stability was improved by A170S (mutation of (c)) and M249L (mutation of (f)).

In addition, among the mutations of A170S, M249L, and V166A, those having 2 or more were found to have improved thermal stability.

Example 5

The enzyme activity was measured for the supernatant of the homogenate of bacterial cells having each OCR1 and the mutations shown in Table 6 obtained in the same manner as in Example 3.

The enzyme activity was confirmed by measuring the amount of decrease in NADPH by the addition of TFAP, at a wavelength of 340 nm in the reaction mixture having the composition shown in Table 5 at a reaction temperature of 30° C. The unit U of enzyme activity indicates the amount of conversion (µmol) per minute.

TABLE 5

| composition | concentration (mmol) | liquid amount (µL) |
|---|---|---|
| potassium phosphate buffer (pH 6.0) at concentration 200 mmol/L MgCl$_2$ at concentration 200 mg/L | 100 | 486 |
| supernatant of bacterial cell homogenate | — | 50 |
| NADPH | 24 | 24 |
| TFAP | 0.011 | 500 |

In the following reaction, the amount of carbonyl reductase was weighed based on the above-mentioned enzyme activity (unit: U).

DOXE and DOLE are respectively the compounds having the following structures.

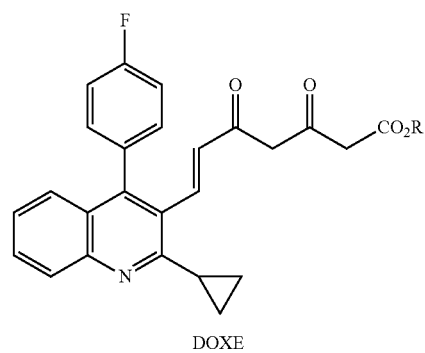

DOXE

-continued

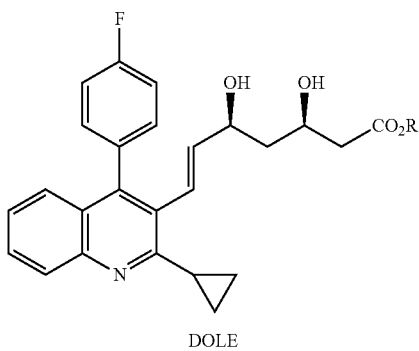

DOLE

A reaction mixture (2 mL) containing DOXE at a concentration of 10 g/L, phosphate buffer (pH 6.0) at a concentration of 100 mmol/L, glucose at a concentration of 120 mmol/L, NADP$^+$ at a concentration of 2 mol %, DMSO at a concentration of 20 wt %, 10 U carbonyl reductase, and 5 U-10 U glucose dehydrogenase was prepared. The reaction mixture was reacted by shaking at 50° C. for 4 hr. The obtained DOLE was analyzed by HLPC under measurement condition 3. The results are shown in Table 6.

TABLE 6

| SEQ ID NO | mutation | DOLE conversion rate |
|---|---|---|
| 1 | none (OCR1) | 14.6% |
| 5 | D54V | 70.1% |
| 19 | M157V/A170S/M214L/M249L | 84.3% |
| 21 | D54V/M157V/A170S/M214L/M249L | 90.5% |

As is clear from Table 6, those having the above-mentioned mutation showed a drastically improved DOLE conversion rate. That is, it was found that those having the mutation are greatly improved in the carbonyl reduction activity and the reaction efficiency.

Reference Example 2

This Reference Example is the method described in WO 2015/119261, Example 4-4.

Ion exchange water (385.9 mL), glucose (48.3 g, 268.1 mmol), NADP$^+$ (manufactured by ORIENTAL YEAST CO., LTD.) (138 mg, 0.18 mmol), dipotassium hydrogen phosphate (8.29 g, 47.6 mmol), and potassium dihydrogen phosphate (3.97 g, 29.2 mmol) were charged and dissolved in a 1 L jar fermentor (manufactured by ABLE Corporation, type BMJ-01). Frozen bacterial cells (50.60 g) of recombinant *Escherichia coli* JM109/pKV32OCR1-GDH and a total amount of a substrate solution prepared by dissolving DOXP (14.4 g, 27.7 mmol) in DMSO (124.20 g, 1589.7 mmol) were added, and the mixture was stirred at an inside temperature of 50° C. for 5 hr. During the reaction, a 25 wt % sodium hydroxide aqueous solution was added dropwise to keep the pH at 6. The fact that DOLP was obtained was confirmed by the retention time of HPLC, and the conversion rate then was 90.25%.

Here, DOXP and DOLP are respectively the compounds having the following structures.

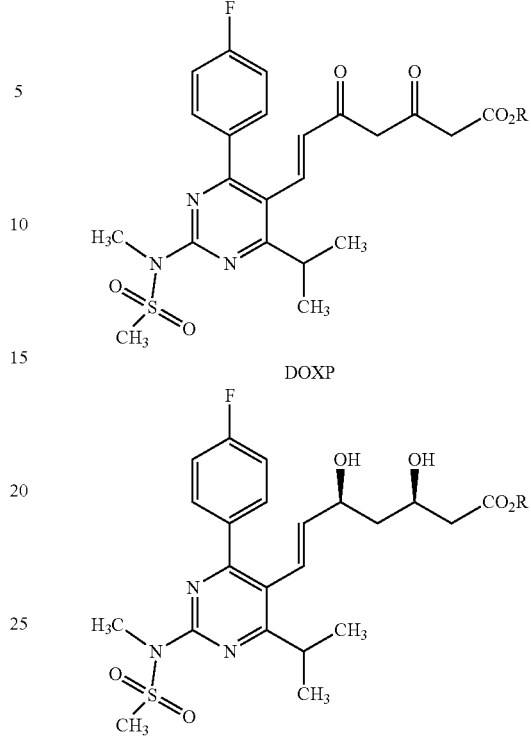

DOXP

DOLP

Example 6

The transformant JM109/pKV32OCR1 (having mutation of A170S/I211A/M249L (SEQ ID NO: 16))-GDH obtained in Example 1 was inoculated into an LB liquid medium containing kanamycin at a concentration of 25 mg/L and IPTG at a concentration of 0.2 mmol/L, and cultured by shaking at 37° C. overnight. The bacterial cells were collected from the obtained culture medium, and a reaction was performed by a method similar to that in Reference Example 2 to obtain DOLP.

The obtained DOLP was analyzed by HPLC under measurement condition 4. As a result, the conversion rate was 95.98%, and the conversion rate was improved as compared with Reference Example 2.

It was found that having the mutation A170S (mutation of I), I211A (mutation of (d)), or M249L (mutation of (f)) improves the reaction efficiency.

INDUSTRIAL APPLICABILITY

According to the present invention, a carbonyl reductase having the activity of reducing a carbonyl group-containing compound to convert the compound into an optically active compound, which is an industrially useful compound as an intermediate raw material for pharmaceutical products, pesticides, and the like, a nucleic acid encoding the carbonyl reductase, a recombinant vector containing the nucleic acid, a transformant containing the recombinant vector can be provided. According to the present invention, moreover, a production method for industrially obtaining an optically active compound, which is industrially useful as an intermediate starting material for medicaments, pesticides, and the like, with high purity, high optical purity, and low cost is provided, and the production efficiency of the pharmaceutical products, pesticides, and the like can be improved and the production can be increased.

This application is based on a patent application No. 2019-211797 filed in Japan (filing date: Nov. 22, 2019), the contents of which are incorporated in full herein.

The invention claimed is:

1. A carbonyl reductase variant comprising an amino acid sequence having at least 90% and less than 100% sequence identity to SEQ ID NO:1 and having carbonyl reductase activity, the variant comprising at least one or more mutation selected from the group of mutations consisting of:
   (a) a mutation in which the 54th aspartic acid in SEQ ID NO: 1 is substituted by valine;
   (b) a mutation in which the 157th methionine in SEQ ID NO: 1 is substituted by valine;
   (c) a mutation in which the 170th alanine in SEQ ID NO: 1 is substituted by serine;
   (d) a mutation in which the 211th isoleucine in SEQ ID NO: 1 is substituted by alanine or asparagine;
   (e) a mutation in which the 214th methionine in SEQ ID NO: 1 is substituted by leucine; and
   (f) a mutation in which the 249th methionine in SEQ ID NO: 1 is substituted by leucine.

2. The carbonyl reductase variant according to claim 1, comprising at least two mutations selected from the group of mutations.

3. The carbonyl reductase variant according to claim 1, further comprising (g) a mutation in which the 166th valine in SEQ ID NO: 1 is substituted by alanine.

4. A method for producing an optically active compound represented by the following formula (IV):

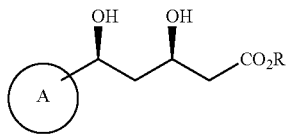
(IV)

wherein:
R is a hydrogen atom, an alkyl group, or an aryl group, and

is a substituent having an aromatic ring or a heterocycle, the method comprising:
asymmetrically reducing a carbonyl group-containing compound selected from the group consisting of compounds represented by the following formulas (I), (II) and (III):

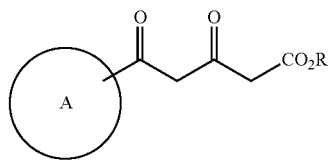
(I)

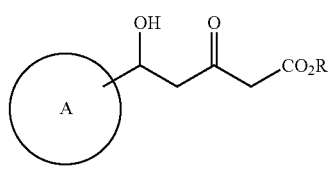
(II)

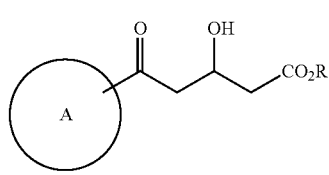
(III)

in the above-mentioned formulas (I), (II) and (III), R is as defined above, and

is as defined above, by bringing the carbonyl group-containing compound into contact with an enzyme, a microorganism or cell having the ability to produce the enzyme, a processed product of the microorganism or cell, or a culture medium containing the enzyme obtained by culturing the microorganism or cell:
   wherein the enzyme is a carbonyl reductase variant comprising an amino acid sequence having at least 90% and less than 100% sequence identity to SEQ ID NO: 1 and having carbonyl reductase activity, the variant comprising at least one or more mutation selected from the group consisting of:
   (a) a mutation in which the 54th aspartic acid in SEQ ID NO: 1 is substituted by valine;
   (b) a mutation in which the 157th methionine in SEQ ID NO: 1 is substituted by valine;
   (c) a mutation in which the 170th alanine in SEQ ID NO: 1 is substituted by serine;
   (d) a mutation in which the 211th isoleucine in SEQ ID NO: 1 is substituted by alanine or asparagine;

(e) a mutation in which the 214th methionine in SEQ ID NO: 1 is substituted by leucine; and (f) a mutation in which the 249th methionine in SEQ ID NO: 1 is substituted by leucine.

5. The production method according to claim 4, wherein the carbonyl group-containing compounds represented by the formula (II) and the formula (III) are respectively an optically active form represented by the following formula (II'):

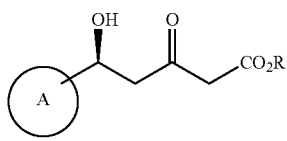
(II')

and an optically active form represented by the following formula (III'):

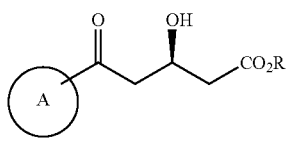
(III')

wherein R and

are as defined above.

6. The production method according to claim 4, wherein the substituent

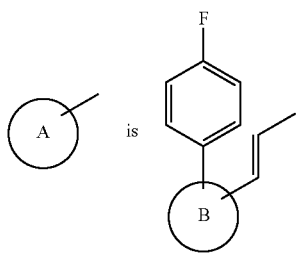 is wherein

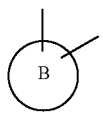

is a substituent having an aromatic ring or a heterocycle,

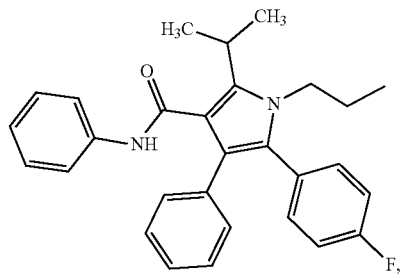

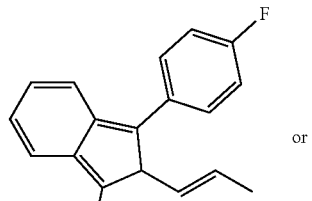 or

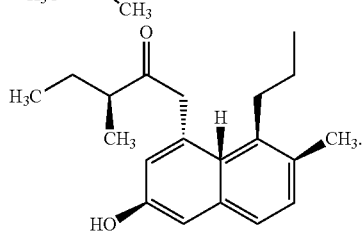

7. The production method according to claim 6, wherein the substituent

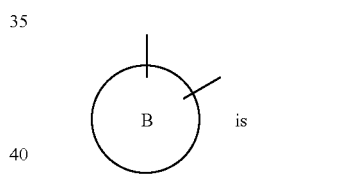 is

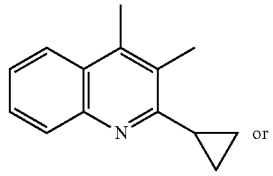 or

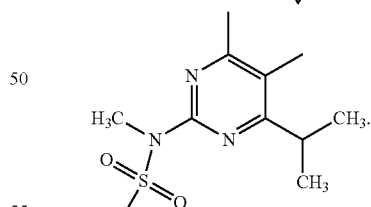

8. The production method according to claim 4, wherein the microorganism or cell is a microorganism or cell transformed with a nucleic acid encoding said carbonyl reductase variant and comprising a nucleotide sequence having not less than 90% and less than 100% sequence identity to SEQ ID NO: 2 and encoding a polypeptide having carbonyl reductase activity.

9. A composition comprising:
an enzyme, wherein the enzyme is the carbonyl reductase variant according to claim 1, a microorganism or cell having the ability to produce the enzyme,
a processed product of the microorganism or cell, or
a culture solution containing the enzyme obtained by:
culturing the microorganism or cell, and
catalyzing a reaction using a carbonyl group-containing compound represented by formula (I), (II), or (III):

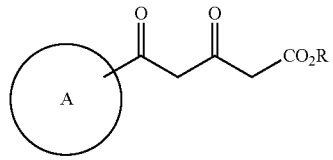

(I)

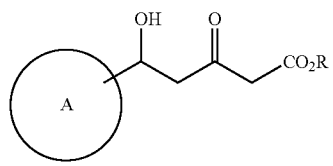

(II)

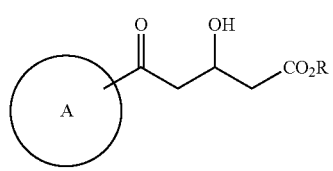

(III)

to produce an optically active compound represented by formula (IV):

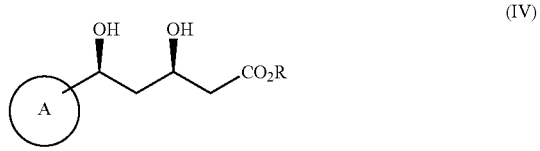

(IV)

wherein in formulas (I), (II), (III), and (IV):
R is a hydrogen atom, an alkyl group, or an aryl group, and

is a substituent having an aromatic ring and/or a heterocycle.

10. The method according to claim 4, wherein the carbonyl reductase variant comprises at least two mutations selected from the group of mutations.

11. The method according to claim 4, wherein the carbonyl reductase variant further comprises (g) a mutation in which the 166th valine in SEQ ID NO: 1 is substituted by alanine.

* * * * *

```
                          SEQUENCE LISTING

<160> NUMBER OF SEQ ID NOS: 22

<210> SEQ ID NO 1
<211> LENGTH: 251
<212> TYPE: PRT
<213> ORGANISM: Ogataea minuta var nonfermentans

<400> SEQUENCE: 1

Met Ala Lys Thr Val Tyr Phe Ile Ala Gly Ala Ser Arg Gly Ile Gly
1               5                   10                  15

Leu Glu Val Ala Ser Gln Leu Ser Ala Asn Pro Asp Asn Tyr Val Ile
                20                  25                  30

Ala Ser Tyr Arg Ser Glu Lys Ser Ala Ser Gly Leu Leu Glu Leu Ala
            35                  40                  45

Lys Lys Asp Asn Val Asp Thr Ile Val Leu Asp Ile Ala Ser Gln Glu
    50                  55                  60

Ser Ile Asp Ala Val Pro Ala Gln Ile Ser Lys Leu Thr Asp Gly Ile
65                  70                  75                  80

Asp Val Ala Leu Ile Asn Ala Gly Ile Ala Asn Ala Met Cys Pro Ile
                85                  90                  95

Leu Glu Cys Ser Arg Glu Ser Tyr Thr Asp His Trp Thr Thr Asn Ala
            100                 105                 110

Leu Gly Pro Ile Met Leu Tyr Gln Ala Ile His Lys Phe Met Leu Gln
        115                 120                 125

Arg Glu Thr Arg Lys Val Phe Phe Thr Thr Ser Ala Gly Gly Ser Ile
    130                 135                 140

Gln Ala Lys Ile Pro Val Pro Val Ser Gly Tyr Gly Met Ser Lys Ala
145                 150                 155                 160

Ala Leu Asn Tyr Ala Val Arg Lys Leu Ala Asp Glu Cys Tyr Lys Asp
                165                 170                 175

Asn Phe Thr Ile Val Leu Leu His Pro Gly Phe Val Lys Thr Asp Met
            180                 185                 190

Gly Gln Ser Ala Ile Gln Lys Met Ser Asn Gly Asn Ala Glu Leu Leu
        195                 200                 205

Ala Tyr Ile Asp Ser Met Thr Ile Asp Val Pro Thr Ser Ala Gly Gln
    210                 215                 220

Ile Val Gly Ala Ile Met Thr Leu Asp Lys Gln Ser Ser Gly Arg Phe
225                 230                 235                 240

Ile Asn Ala Ala Asp Gln Phe Asp Met Pro Phe
                245                 250

<210> SEQ ID NO 2
<211> LENGTH: 759
<212> TYPE: DNA
<213> ORGANISM: Ogataea minuta var nonfermentans

<400> SEQUENCE: 2
atggctaaaa ctgtttactt catcgcaggt gcttccagag gtatcggtct cgaggttgct        60
tcccagctga gtgcaaaccc agacaattat gttattgcat cctatagatc tgaaaagtct       120
gcttcaggac ttttggagct ggcaaagaag gataatgtcg acacaattgt gttggatatt       180
gcaagccagg aatcgattga tgctgttcca gcacagattt ccaagctgac tgatggaatc       240
```

```
gatgttgcct tgatcaacgc tggaattgcc aacgctatgt gtccgattct cgaatgttct    300
agagagtcct acactgatca ctggacaacc aatgccttgg gtccaatcat gctctaccaa    360
gctattcata agttcatgct ccagagagag accagaaaag tgttctttac cacgagtgct    420
ggtggttcca ttcaggctaa gatacccgtg cctgtgagtg gttacggtat gtccaaggct    480
gcgcttaatt atgctgtgag aaaacttgct gacgagtgct acaaggacaa cttcactatt    540
gtgttgctgc atcctggttt tgttaagacg gacatgggtc aaagcgccat tcagaagatg    600
tcaaatggaa atgctgagct tcttgcttac attgactcaa tgactattga tgttcctacc    660
agtgctggcc aaatcgtcgg tgccattatg accttggaca agcagagcag cggtagattt    720
atcaacgctg ctgaccagtt tgacatgcca ttttagtaa                          759
```

<210> SEQ ID NO 3
<211> LENGTH: 261
<212> TYPE: PRT
<213> ORGANISM: Bacillus subtilis

<400> SEQUENCE: 3

```
Met Tyr Pro Asp Leu Lys Gly Lys Val Val Ala Ile Thr Gly Ala Ala
1               5                   10                  15

Ser Gly Leu Gly Lys Ala Met Ala Ile Arg Phe Gly Lys Glu Gln Ala
            20                  25                  30

Lys Val Val Ile Asn Tyr Tyr Ser Asn Lys Gln Asp Pro Asn Glu Val
        35                  40                  45

Lys Glu Glu Val Ile Lys Ala Gly Gly Glu Ala Val Val Gln Gly
    50                  55                  60

Asp Val Thr Lys Glu Glu Asp Val Lys Asn Ile Val Gln Thr Ala Ile
65                  70                  75                  80

Lys Glu Phe Gly Thr Leu Asp Ile Met Ile Asn Asn Ala Gly Leu Ala
                85                  90                  95

Asn Pro Val Pro Ser His Glu Met Pro Leu Lys Asp Trp Asp Lys Val
            100                 105                 110

Ile Gly Thr Asn Leu Thr Gly Ala Phe Leu Gly Ser Arg Glu Ala Ile
        115                 120                 125

Lys Tyr Phe Val Glu Asn Asp Ile Lys Gly Asn Val Ile Asn Met Ser
    130                 135                 140

Ser Val His Glu Val Ile Pro Trp Pro Leu Phe Val His Tyr Ala Ala
145                 150                 155                 160

Ser Lys Gly Gly Ile Lys Leu Met Thr Glu Thr Leu Ala Leu Glu Tyr
                165                 170                 175

Ala Pro Lys Gly Ile Arg Val Asn Asn Ile Gly Pro Gly Ala Ile Asn
            180                 185                 190

Thr Pro Ile Asn Ala Glu Lys Phe Ala Asp Pro Lys Gln Lys Ala Asp
        195                 200                 205

Val Glu Ser Met Ile Pro Met Gly Tyr Ile Gly Glu Pro Glu Glu Ile
    210                 215                 220

Ala Ala Val Ala Ala Trp Leu Ala Ser Lys Glu Ala Ser Tyr Val Thr
225                 230                 235                 240

Gly Ile Thr Leu Phe Ala Asp Gly Gly Met Thr Leu Tyr Pro Ser Phe
                245                 250                 255

Gln Ala Gly Arg Gly
            260
```

<210> SEQ ID NO 4

```
<211> LENGTH: 786
<212> TYPE: DNA
<213> ORGANISM: Bacillus subtilis

<400> SEQUENCE: 4
atgtatccgg atttaaaagg aaaagtcgtc gctattacag gagctgcttc agggctcgga      60
aaggcgatgg ccattcgctt cggcaaggag caggcaaaag tggttatcaa ctattatagt     120
aataaacaag atccgaacga ggtaaaagaa gaggtcatca aggcgggcgg tgaagctgtt     180
gtcgtccaag gagatgtcac gaaagaggaa gatgtaaaaa atatcgtgca aacggcaatt     240
aaggagttcg gcacactcga tattatgatt aataatgccg tcttgcaaa tcctgtgcca      300 tctcacgaaa tgccgctcaa ggattgggat aaagtcatcg gcacgaactt aacgggtgcc     360
tttttaggaa gccgtgaagc gattaaatat ttcgtagaaa acgatatcaa gggaaatgtc     420
attaacatgt ccagtgtgca cgaagtgatt ccttggccgt tatttgtcca ctatgcggca     480
agtaaaggcg ggataaagct gatgacagaa acattagcgt tggaatacgc gccgaagggc     540
attcgcgtca ataatattgg gccaggtgcg atcaacacgc caatcaatgc tgaaaaattc     600
gctgacccta aacagaaagc tgatgtagaa agcatgattc caatgggata tatcggcgaa     660
ccggaggaga tcgccgcagt agcagcctgg cttgcttcga aggaagccag ctacgtcaca     720
ggcatcacgt tattcgcgga cggcggtatg acacaatatc cttcattcca ggcaggccgc     780
ggttaa                                                                786

<210> SEQ ID NO 5
<211> LENGTH: 251
<212> TYPE: PRT
<213> ORGANISM: Ogataea minuta var nonfermentans

<400> SEQUENCE: 5

Met Ala Lys Thr Val Tyr Phe Ile Ala Gly Ala Ser Arg Gly Ile Gly
1               5                   10                  15

Leu Glu Val Ala Ser Gln Leu Ser Ala Asn Pro Asp Asn Tyr Val Ile
            20                  25                  30

Ala Ser Tyr Arg Ser Glu Lys Ser Ala Ser Gly Leu Leu Glu Leu Ala
        35                  40                  45

Lys Lys Asp Asn Val Val Thr Ile Val Leu Asp Ile Ala Ser Gln Glu
    50                  55                  60

Ser Ile Asp Ala Val Pro Ala Gln Ile Ser Lys Leu Thr Asp Gly Ile
65                  70                  75                  80

Asp Val Ala Leu Ile Asn Ala Gly Ile Ala Asn Ala Met Cys Pro Ile
                85                  90                  95

Leu Glu Cys Ser Arg Glu Ser Tyr Thr Asp His Trp Thr Thr Asn Ala
            100                 105                 110

Leu Gly Pro Ile Met Leu Tyr Gln Ala Ile His Lys Phe Met Leu Gln
        115                 120                 125

Arg Glu Thr Arg Lys Val Phe Phe Thr Thr Ser Ala Gly Gly Ser Ile
    130                 135                 140

Gln Ala Lys Ile Pro Val Pro Val Ser Gly Tyr Gly Met Ser Lys Ala
145                 150                 155                 160

Ala Leu Asn Tyr Ala Val Arg Lys Leu Ala Asp Glu Cys Tyr Lys Asp
                165                 170                 175

Asn Phe Thr Ile Val Leu Leu His Pro Gly Phe Val Lys Thr Asp Met
            180                 185                 190

Gly Gln Ser Ala Ile Gln Lys Met Ser Asn Gly Asn Ala Glu Leu Leu
```

```
            195                 200                 205
Ala Tyr Ile Asp Ser Met Thr Ile Asp Val Pro Thr Ser Ala Gly Gln
        210                 215                 220

Ile Val Gly Ala Ile Met Thr Leu Asp Lys Gln Ser Ser Gly Arg Phe
225                 230                 235                 240

Ile Asn Ala Ala Asp Gln Phe Asp Met Pro Phe
                245                 250

<210> SEQ ID NO 6
<211> LENGTH: 251
<212> TYPE: PRT
<213> ORGANISM: Ogataea minuta var nonfermentans

<400> SEQUENCE: 6

Met Ala Lys Thr Val Tyr Phe Ile Ala Gly Ala Ser Arg Gly Ile Gly
1               5                   10                  15

Leu Glu Val Ala Ser Gln Leu Ser Ala Asn Pro Asp Asn Tyr Val Ile
            20                  25                  30

Ala Ser Tyr Arg Ser Glu Lys Ser Ala Ser Gly Leu Leu Glu Leu Ala
        35                  40                  45

Lys Lys Asp Asn Val Asp Thr Ile Val Leu Asp Ile Ala Ser Gln Glu
    50                  55                  60

Ser Ile Asp Ala Val Pro Ala Gln Ile Ser Lys Leu Thr Asp Gly Ile
65                  70                  75                  80

Asp Val Ala Leu Ile Asn Ala Gly Ile Ala Asn Ala Met Cys Pro Ile
                85                  90                  95

Leu Glu Cys Ser Arg Glu Ser Tyr Thr Asp His Trp Thr Thr Asn Ala
            100                 105                 110

Leu Gly Pro Ile Met Leu Tyr Gln Ala Ile His Lys Phe Met Leu Gln
        115                 120                 125

Arg Glu Thr Arg Lys Val Phe Phe Thr Thr Ser Ala Gly Gly Ser Ile
130                 135                 140

Gln Ala Lys Ile Pro Val Pro Val Ser Gly Tyr Gly Met Ser Lys Ala
145                 150                 155                 160

Ala Leu Asn Tyr Ala Ala Arg Lys Leu Ala Asp Glu Cys Tyr Lys Asp
                165                 170                 175

Asn Phe Thr Ile Val Leu Leu His Pro Gly Phe Val Lys Thr Asp Met
            180                 185                 190

Gly Gln Ser Ala Ile Gln Lys Met Ser Asn Gly Asn Ala Glu Leu Leu
        195                 200                 205

Ala Tyr Ile Asp Ser Met Thr Ile Asp Val Pro Thr Ser Ala Gly Gln
    210                 215                 220

Ile Val Gly Ala Ile Met Thr Leu Asp Lys Gln Ser Ser Gly Arg Phe
225                 230                 235                 240

Ile Asn Ala Ala Asp Gln Phe Asp Met Pro Phe
                245                 250

<210> SEQ ID NO 7
<211> LENGTH: 251
<212> TYPE: PRT
<213> ORGANISM: Ogataea minuta var nonfermentans

<400> SEQUENCE: 7

Met Ala Lys Thr Val Tyr Phe Ile Ala Gly Ala Ser Arg Gly Ile Gly
1               5                   10                  15

Leu Glu Val Ala Ser Gln Leu Ser Ala Asn Pro Asp Asn Tyr Val Ile
```

```
                    20                  25                  30
Ala Ser Tyr Arg Ser Glu Lys Ser Ala Ser Gly Leu Leu Glu Leu Ala
            35                  40                  45

Lys Lys Asp Asn Val Asp Thr Ile Val Leu Asp Ile Ala Ser Gln Glu
    50                  55                  60

Ser Ile Asp Ala Val Pro Ala Gln Ile Ser Lys Leu Thr Asp Gly Ile
65                  70                  75                  80

Asp Val Ala Leu Ile Asn Ala Gly Ile Ala Asn Ala Met Cys Pro Ile
                85                  90                  95

Leu Glu Cys Ser Arg Glu Ser Tyr Thr Asp His Trp Thr Thr Asn Ala
            100                 105                 110

Leu Gly Pro Ile Met Leu Tyr Gln Ala Ile His Lys Phe Met Leu Gln
        115                 120                 125

Arg Glu Thr Arg Lys Val Phe Phe Thr Thr Ser Ala Gly Gly Ser Ile
        130                 135                 140

Gln Ala Lys Ile Pro Val Pro Val Ser Gly Tyr Gly Met Ser Lys Ala
145                 150                 155                 160

Ala Leu Asn Tyr Ala Val Arg Lys Leu Ser Asp Glu Cys Tyr Lys Asp
                165                 170                 175

Asn Phe Thr Ile Val Leu Leu His Pro Gly Phe Val Lys Thr Asp Met
            180                 185                 190

Gly Gln Ser Ala Ile Gln Lys Met Ser Asn Gly Asn Ala Glu Leu Leu
        195                 200                 205

Ala Tyr Ile Asp Ser Met Thr Ile Asp Val Pro Thr Ser Ala Gly Gln
        210                 215                 220

Ile Val Gly Ala Ile Met Thr Leu Asp Lys Gln Ser Ser Gly Arg Phe
225                 230                 235                 240

Ile Asn Ala Ala Asp Gln Phe Asp Met Pro Phe
                245                 250

<210> SEQ ID NO 8
<211> LENGTH: 251
<212> TYPE: PRT
<213> ORGANISM: Ogataea minuta var nonfermentans

<400> SEQUENCE: 8

Met Ala Lys Thr Val Tyr Phe Ile Ala Gly Ala Ser Arg Gly Ile Gly
1               5                   10                  15

Leu Glu Val Ala Ser Gln Leu Ser Ala Asn Pro Asp Asn Tyr Val Ile
            20                  25                  30

Ala Ser Tyr Arg Ser Glu Lys Ser Ala Ser Gly Leu Leu Glu Leu Ala
        35                  40                  45

Lys Lys Asp Asn Val Asp Thr Ile Val Leu Asp Ile Ala Ser Gln Glu
    50                  55                  60

Ser Ile Asp Ala Val Pro Ala Gln Ile Ser Lys Leu Thr Asp Gly Ile
65                  70                  75                  80

Asp Val Ala Leu Ile Asn Ala Gly Ile Ala Asn Ala Met Cys Pro Ile
                85                  90                  95

Leu Glu Cys Ser Arg Glu Ser Tyr Thr Asp His Trp Thr Thr Asn Ala
            100                 105                 110

Leu Gly Pro Ile Met Leu Tyr Gln Ala Ile His Lys Phe Met Leu Gln
        115                 120                 125

Arg Glu Thr Arg Lys Val Phe Phe Thr Thr Ser Ala Gly Gly Ser Ile
        130                 135                 140
```

Gln Ala Lys Ile Pro Val Pro Val Ser Gly Tyr Gly Met Ser Lys Ala
145                 150                 155                 160

Ala Leu Asn Tyr Ala Val Arg Lys Leu Ala Asp Glu Cys Tyr Lys Asp
            165                 170                 175

Asn Phe Thr Ile Val Leu Leu His Pro Gly Phe Val Lys Thr Asp Met
            180                 185                 190

Gly Gln Ser Ala Ile Gln Lys Met Ser Asn Gly Asn Ala Glu Leu Leu
            195                 200                 205

Ala Tyr Asn Asp Ser Met Thr Ile Asp Val Pro Thr Ser Ala Gly Gln
            210                 215                 220

Ile Val Gly Ala Ile Met Thr Leu Asp Lys Gln Ser Ser Gly Arg Phe
225                 230                 235                 240

Ile Asn Ala Ala Asp Gln Phe Asp Met Pro Phe
            245                 250

<210> SEQ ID NO 9
<211> LENGTH: 251
<212> TYPE: PRT
<213> ORGANISM: Ogataea minuta var nonfermentans

<400> SEQUENCE: 9

Met Ala Lys Thr Val Tyr Phe Ile Ala Gly Ala Ser Arg Gly Ile Gly
1               5                   10                  15

Leu Glu Val Ala Ser Gln Leu Ser Ala Asn Pro Asp Asn Tyr Val Ile
            20                  25                  30

Ala Ser Tyr Arg Ser Glu Lys Ser Ala Ser Gly Leu Leu Glu Leu Ala
            35                  40                  45

Lys Lys Asp Asn Val Asp Thr Ile Val Leu Asp Ile Ala Ser Gln Glu
50                  55                  60

Ser Ile Asp Ala Val Pro Ala Gln Ile Ser Lys Leu Thr Asp Gly Ile
65                  70                  75                  80

Asp Val Ala Leu Ile Asn Ala Gly Ile Ala Asn Ala Met Cys Pro Ile
            85                  90                  95

Leu Glu Cys Ser Arg Glu Ser Tyr Thr Asp His Trp Thr Thr Asn Ala
            100                 105                 110

Leu Gly Pro Ile Met Leu Tyr Gln Ala Ile His Lys Phe Met Leu Gln
            115                 120                 125

Arg Glu Thr Arg Lys Val Phe Phe Thr Thr Ser Ala Gly Gly Ser Ile
            130                 135                 140

Gln Ala Lys Ile Pro Val Pro Val Ser Gly Tyr Gly Met Ser Lys Ala
145                 150                 155                 160

Ala Leu Asn Tyr Ala Val Arg Lys Leu Ala Asp Glu Cys Tyr Lys Asp
            165                 170                 175

Asn Phe Thr Ile Val Leu Leu His Pro Gly Phe Val Lys Thr Asp Met
            180                 185                 190

Gly Gln Ser Ala Ile Gln Lys Met Ser Asn Gly Asn Ala Glu Leu Leu
            195                 200                 205

Ala Tyr Ala Asp Ser Met Thr Ile Asp Val Pro Thr Ser Ala Gly Gln
            210                 215                 220

Ile Val Gly Ala Ile Met Thr Leu Asp Lys Gln Ser Ser Gly Arg Phe
225                 230                 235                 240

Ile Asn Ala Ala Asp Gln Phe Asp Met Pro Phe
            245                 250

<210> SEQ ID NO 10

```
<211> LENGTH: 251
<212> TYPE: PRT
<213> ORGANISM: Ogataea minuta var nonfermentans

<400> SEQUENCE: 10
```

Met Ala Lys Thr Val Tyr Phe Ile Ala Gly Ala Ser Arg Gly Ile Gly
1               5                   10                  15

Leu Glu Val Ala Ser Gln Leu Ser Ala Asn Pro Asp Asn Tyr Val Ile
            20                  25                  30

Ala Ser Tyr Arg Ser Glu Lys Ser Ala Ser Gly Leu Leu Glu Leu Ala
        35                  40                  45

Lys Lys Asp Asn Val Asp Thr Ile Val Leu Asp Ile Ala Ser Gln Glu
50                  55                  60

Ser Ile Asp Ala Val Pro Ala Gln Ile Ser Lys Leu Thr Asp Gly Ile
65                  70                  75                  80

Asp Val Ala Leu Ile Asn Ala Gly Ile Ala Asn Ala Met Cys Pro Ile
                85                  90                  95

Leu Glu Cys Ser Arg Glu Ser Tyr Thr Asp His Trp Thr Thr Asn Ala
            100                 105                 110

Leu Gly Pro Ile Met Leu Tyr Gln Ala Ile His Lys Phe Met Leu Gln
        115                 120                 125

Arg Glu Thr Arg Lys Val Phe Phe Thr Thr Ser Ala Gly Gly Ser Ile
130                 135                 140

Gln Ala Lys Ile Pro Val Pro Val Ser Gly Tyr Gly Met Ser Lys Ala
145                 150                 155                 160

Ala Leu Asn Tyr Ala Val Arg Lys Leu Ala Asp Glu Cys Tyr Lys Asp
                165                 170                 175

Asn Phe Thr Ile Val Leu Leu His Pro Gly Phe Val Lys Thr Asp Met
            180                 185                 190

Gly Gln Ser Ala Ile Gln Lys Met Ser Asn Gly Asn Ala Glu Leu Leu
        195                 200                 205

Ala Tyr Ile Asp Ser Met Thr Ile Asp Val Pro Thr Ser Ala Gly Gln
    210                 215                 220

Ile Val Gly Ala Ile Met Thr Leu Asp Lys Gln Ser Ser Gly Arg Phe
225                 230                 235                 240

Ile Asn Ala Ala Asp Gln Phe Asp Leu Pro Phe
                245                 250

```
<210> SEQ ID NO 11
<211> LENGTH: 251
<212> TYPE: PRT
<213> ORGANISM: Ogataea minuta var nonfermentans

<400> SEQUENCE: 11
```

Met Ala Lys Thr Val Tyr Phe Ile Ala Gly Ala Ser Arg Gly Ile Gly
1               5                   10                  15

Leu Glu Val Ala Ser Gln Leu Ser Ala Asn Pro Asp Asn Tyr Val Ile
            20                  25                  30

Ala Ser Tyr Arg Ser Glu Lys Ser Ala Ser Gly Leu Leu Glu Leu Ala
        35                  40                  45

Lys Lys Asp Asn Val Asp Thr Ile Val Leu Asp Ile Ala Ser Gln Glu
50                  55                  60

Ser Ile Asp Ala Val Pro Ala Gln Ile Ser Lys Leu Thr Asp Gly Ile
65                  70                  75                  80

Asp Val Ala Leu Ile Asn Ala Gly Ile Ala Asn Ala Met Cys Pro Ile
                85                  90                  95

Leu Glu Cys Ser Arg Glu Ser Tyr Thr Asp His Trp Thr Thr Asn Ala
            100                 105                 110

Leu Gly Pro Ile Met Leu Tyr Gln Ala Ile His Lys Phe Met Leu Gln
            115                 120                 125

Arg Glu Thr Arg Lys Val Phe Phe Thr Thr Ser Ala Gly Gly Ser Ile
130                 135                 140

Gln Ala Lys Ile Pro Val Pro Val Ser Gly Tyr Gly Met Ser Lys Ala
145                 150                 155                 160

Ala Leu Asn Tyr Ala Val Arg Lys Leu Ser Asp Glu Cys Tyr Lys Asp
                165                 170                 175

Asn Phe Thr Ile Val Leu Leu His Pro Gly Phe Val Lys Thr Asp Met
                180                 185                 190

Gly Gln Ser Ala Ile Gln Lys Met Ser Asn Gly Asn Ala Glu Leu Leu
                195                 200                 205

Ala Tyr Ile Asp Ser Met Thr Ile Asp Val Pro Thr Ser Ala Gly Gln
            210                 215                 220

Ile Val Gly Ala Ile Met Thr Leu Asp Lys Gln Ser Ser Gly Arg Phe
225                 230                 235                 240

Ile Asn Ala Ala Asp Gln Phe Asp Leu Pro Phe
                245                 250

<210> SEQ ID NO 12
<211> LENGTH: 251
<212> TYPE: PRT
<213> ORGANISM: Ogataea minuta var nonfermentans

<400> SEQUENCE: 12

Met Ala Lys Thr Val Tyr Phe Ile Ala Gly Ala Ser Arg Gly Ile Gly
1               5                   10                  15

Leu Glu Val Ala Ser Gln Leu Ser Ala Asn Pro Asp Asn Tyr Val Ile
            20                  25                  30

Ala Ser Tyr Arg Ser Glu Lys Ser Ala Ser Gly Leu Leu Glu Leu Ala
            35                  40                  45

Lys Lys Asp Asn Val Asp Thr Ile Val Leu Asp Ile Ala Ser Gln Glu
50                  55                  60

Ser Ile Asp Ala Val Pro Ala Gln Ile Ser Lys Leu Thr Asp Gly Ile
65                  70                  75                  80

Asp Val Ala Leu Ile Asn Ala Gly Ile Ala Asn Ala Met Cys Pro Ile
                85                  90                  95

Leu Glu Cys Ser Arg Glu Ser Tyr Thr Asp His Trp Thr Thr Asn Ala
            100                 105                 110

Leu Gly Pro Ile Met Leu Tyr Gln Ala Ile His Lys Phe Met Leu Gln
            115                 120                 125

Arg Glu Thr Arg Lys Val Phe Phe Thr Thr Ser Ala Gly Gly Ser Ile
130                 135                 140

Gln Ala Lys Ile Pro Val Pro Val Ser Gly Tyr Gly Met Ser Lys Ala
145                 150                 155                 160

Ala Leu Asn Tyr Ala Ala Arg Lys Leu Ala Asp Glu Cys Tyr Lys Asp
                165                 170                 175

Asn Phe Thr Ile Val Leu Leu His Pro Gly Phe Val Lys Thr Asp Met
                180                 185                 190

Gly Gln Ser Ala Ile Gln Lys Met Ser Asn Gly Asn Ala Glu Leu Leu
                195                 200                 205

Ala Tyr Ile Asp Ser Met Thr Ile Asp Val Pro Thr Ser Ala Gly Gln

Ile Val Gly Ala Ile Met Thr Leu Asp Lys Gln Ser Ser Gly Arg Phe
225                 230                 235                 240

Ile Asn Ala Ala Asp Gln Phe Asp Leu Pro Phe
                245                 250

<210> SEQ ID NO 13
<211> LENGTH: 251
<212> TYPE: PRT
<213> ORGANISM: Ogataea minuta var nonfermentans

<400> SEQUENCE: 13

Met Ala Lys Thr Val Tyr Phe Ile Ala Gly Ala Ser Arg Gly Ile Gly
1               5                   10                  15

Leu Glu Val Ala Ser Gln Leu Ser Ala Asn Pro Asp Asn Tyr Val Ile
            20                  25                  30

Ala Ser Tyr Arg Ser Glu Lys Ser Ala Ser Gly Leu Leu Glu Leu Ala
        35                  40                  45

Lys Lys Asp Asn Val Asp Thr Ile Val Leu Asp Ile Ala Ser Gln Glu
50                  55                  60

Ser Ile Asp Ala Val Pro Ala Gln Ile Ser Lys Leu Thr Asp Gly Ile
65                  70                  75                  80

Asp Val Ala Leu Ile Asn Ala Gly Ile Ala Asn Ala Met Cys Pro Ile
                85                  90                  95

Leu Glu Cys Ser Arg Glu Ser Tyr Thr Asp His Trp Thr Thr Asn Ala
            100                 105                 110

Leu Gly Pro Ile Met Leu Tyr Gln Ala Ile His Lys Phe Met Leu Gln
        115                 120                 125

Arg Glu Thr Arg Lys Val Phe Phe Thr Thr Ser Ala Gly Gly Ser Ile
130                 135                 140

Gln Ala Lys Ile Pro Val Pro Val Ser Gly Tyr Gly Val Ser Lys Ala
145                 150                 155                 160

Ala Leu Asn Tyr Ala Val Arg Lys Leu Ser Asp Glu Cys Tyr Lys Asp
                165                 170                 175

Asn Phe Thr Ile Val Leu Leu His Pro Gly Phe Val Lys Thr Asp Met
            180                 185                 190

Gly Gln Ser Ala Ile Gln Lys Met Ser Asn Gly Asn Ala Glu Leu Leu
        195                 200                 205

Ala Tyr Ile Asp Ser Met Thr Ile Asp Val Pro Thr Ser Ala Gly Gln
210                 215                 220

Ile Val Gly Ala Ile Met Thr Leu Asp Lys Gln Ser Ser Gly Arg Phe
225                 230                 235                 240

Ile Asn Ala Ala Asp Gln Phe Asp Leu Pro Phe
                245                 250

<210> SEQ ID NO 14
<211> LENGTH: 251
<212> TYPE: PRT
<213> ORGANISM: Ogataea minuta var nonfermentans

<400> SEQUENCE: 14

Met Ala Lys Thr Val Tyr Phe Ile Ala Gly Ala Ser Arg Gly Ile Gly
1               5                   10                  15

Leu Glu Val Ala Ser Gln Leu Ser Ala Asn Pro Asp Asn Tyr Val Ile
            20                  25                  30

Ala Ser Tyr Arg Ser Glu Lys Ser Ala Ser Gly Leu Leu Glu Leu Ala

```
            35                  40                  45
Lys Lys Asp Asn Val Asp Thr Ile Val Leu Asp Ile Ala Ser Gln Glu
 50                  55                  60

Ser Ile Asp Ala Val Pro Ala Gln Ile Ser Lys Leu Thr Asp Gly Ile
 65                  70                  75                  80

Asp Val Ala Leu Ile Asn Ala Gly Ile Ala Asn Ala Met Cys Pro Ile
                 85                  90                  95

Leu Glu Cys Ser Arg Glu Ser Tyr Thr Asp His Trp Thr Thr Asn Ala
                100                 105                 110

Leu Gly Pro Ile Met Leu Tyr Gln Ala Ile His Lys Phe Met Leu Gln
                115                 120                 125

Arg Glu Thr Arg Lys Val Phe Phe Thr Thr Ser Ala Gly Gly Ser Ile
                130                 135                 140

Gln Ala Lys Ile Pro Val Pro Val Ser Gly Tyr Gly Met Ser Lys Ala
145                 150                 155                 160

Ala Leu Asn Tyr Ala Ala Arg Lys Leu Ser Asp Glu Cys Tyr Lys Asp
                165                 170                 175

Asn Phe Thr Ile Val Leu Leu His Pro Gly Phe Val Lys Thr Asp Met
                180                 185                 190

Gly Gln Ser Ala Ile Gln Lys Met Ser Asn Gly Asn Ala Glu Leu Leu
                195                 200                 205

Ala Tyr Ile Asp Ser Met Thr Ile Asp Val Pro Thr Ser Ala Gly Gln
                210                 215                 220

Ile Val Gly Ala Ile Met Thr Leu Asp Lys Gln Ser Ser Gly Arg Phe
225                 230                 235                 240

Ile Asn Ala Ala Asp Gln Phe Asp Leu Pro Phe
                245                 250

<210> SEQ ID NO 15
<211> LENGTH: 251
<212> TYPE: PRT
<213> ORGANISM: Ogataea minuta var nonfermentans

<400> SEQUENCE: 15

Met Ala Lys Thr Val Tyr Phe Ile Ala Gly Ala Ser Arg Gly Ile Gly
 1                5                  10                  15

Leu Glu Val Ala Ser Gln Leu Ser Ala Asn Pro Asp Asn Tyr Val Ile
                 20                  25                  30

Ala Ser Tyr Arg Ser Glu Lys Ser Ala Ser Gly Leu Leu Glu Leu Ala
                 35                  40                  45

Lys Lys Asp Asn Val Asp Thr Ile Val Leu Asp Ile Ala Ser Gln Glu
 50                  55                  60

Ser Ile Asp Ala Val Pro Ala Gln Ile Ser Lys Leu Thr Asp Gly Ile
 65                  70                  75                  80

Asp Val Ala Leu Ile Asn Ala Gly Ile Ala Asn Ala Met Cys Pro Ile
                 85                  90                  95

Leu Glu Cys Ser Arg Glu Ser Tyr Thr Asp His Trp Thr Thr Asn Ala
                100                 105                 110

Leu Gly Pro Ile Met Leu Tyr Gln Ala Ile His Lys Phe Met Leu Gln
                115                 120                 125

Arg Glu Thr Arg Lys Val Phe Phe Thr Thr Ser Ala Gly Gly Ser Ile
                130                 135                 140

Gln Ala Lys Ile Pro Val Pro Val Ser Gly Tyr Gly Met Ser Lys Ala
145                 150                 155                 160
```

```
Ala Leu Asn Tyr Ala Ala Arg Lys Leu Ala Asp Glu Cys Tyr Lys Asp
                165                 170                 175

Asn Phe Thr Ile Val Leu Leu His Pro Gly Phe Val Lys Thr Asp Met
            180                 185                 190

Gly Gln Ser Ala Ile Gln Lys Met Ser Asn Gly Asn Ala Glu Leu Leu
        195                 200                 205

Ala Tyr Ile Asp Ser Leu Thr Ile Asp Val Pro Thr Ser Ala Gly Gln
    210                 215                 220

Ile Val Gly Ala Ile Met Thr Leu Asp Lys Gln Ser Ser Gly Arg Phe
225                 230                 235                 240

Ile Asn Ala Ala Asp Gln Phe Asp Leu Pro Phe
                245                 250

<210> SEQ ID NO 16
<211> LENGTH: 251
<212> TYPE: PRT
<213> ORGANISM: Ogataea minuta var nonfermentans

<400> SEQUENCE: 16

Met Ala Lys Thr Val Tyr Phe Ile Ala Gly Ala Ser Arg Gly Ile Gly
1               5                   10                  15

Leu Glu Val Ala Ser Gln Leu Ser Ala Asn Pro Asp Asn Tyr Val Ile
            20                  25                  30

Ala Ser Tyr Arg Ser Glu Lys Ser Ala Ser Gly Leu Leu Glu Leu Ala
        35                  40                  45

Lys Lys Asp Asn Val Asp Thr Ile Val Leu Asp Ile Ala Ser Gln Glu
    50                  55                  60

Ser Ile Asp Ala Val Pro Ala Gln Ile Ser Lys Leu Thr Asp Gly Ile
65                  70                  75                  80

Asp Val Ala Leu Ile Asn Ala Gly Ile Ala Asn Ala Met Cys Pro Ile
                85                  90                  95

Leu Glu Cys Ser Arg Glu Ser Tyr Thr Asp His Trp Thr Thr Asn Ala
            100                 105                 110

Leu Gly Pro Ile Met Leu Tyr Gln Ala Ile His Lys Phe Met Leu Gln
        115                 120                 125

Arg Glu Thr Arg Lys Val Phe Phe Thr Thr Ser Ala Gly Gly Ser Ile
    130                 135                 140

Gln Ala Lys Ile Pro Val Pro Val Ser Gly Tyr Gly Met Ser Lys Ala
145                 150                 155                 160

Ala Leu Asn Tyr Ala Val Arg Lys Leu Ser Asp Glu Cys Tyr Lys Asp
                165                 170                 175

Asn Phe Thr Ile Val Leu Leu His Pro Gly Phe Val Lys Thr Asp Met
            180                 185                 190

Gly Gln Ser Ala Ile Gln Lys Met Ser Asn Gly Asn Ala Glu Leu Leu
        195                 200                 205

Ala Tyr Ala Asp Ser Met Thr Ile Asp Val Pro Thr Ser Ala Gly Gln
    210                 215                 220

Ile Val Gly Ala Ile Met Thr Leu Asp Lys Gln Ser Ser Gly Arg Phe
225                 230                 235                 240

Ile Asn Ala Ala Asp Gln Phe Asp Leu Pro Phe
                245                 250

<210> SEQ ID NO 17
<211> LENGTH: 251
<212> TYPE: PRT
<213> ORGANISM: Ogataea minuta var nonfermentans
```

<400> SEQUENCE: 17

```
Met Ala Lys Thr Val Tyr Phe Ile Ala Gly Ala Ser Arg Gly Ile Gly
1               5                   10                  15

Leu Glu Val Ala Ser Gln Leu Ser Ala Asn Pro Asp Asn Tyr Val Ile
            20                  25                  30

Ala Ser Tyr Arg Ser Glu Lys Ser Ala Ser Gly Leu Leu Glu Leu Ala
        35                  40                  45

Lys Lys Asp Asn Val Asp Thr Ile Val Leu Asp Ile Ala Ser Gln Glu
50                  55                  60

Ser Ile Asp Ala Val Pro Ala Gln Ile Ser Lys Leu Thr Asp Gly Ile
65                  70                  75                  80

Asp Val Ala Leu Ile Asn Ala Gly Ile Ala Asn Ala Met Cys Pro Ile
                85                  90                  95

Leu Glu Cys Ser Arg Glu Ser Tyr Thr Asp His Trp Thr Thr Asn Ala
            100                 105                 110

Leu Gly Pro Ile Met Leu Tyr Gln Ala Ile His Lys Phe Met Leu Gln
        115                 120                 125

Arg Glu Thr Arg Lys Val Phe Phe Thr Thr Ser Ala Gly Gly Ser Ile
130                 135                 140

Gln Ala Lys Ile Pro Val Pro Val Ser Gly Tyr Gly Met Ser Lys Ala
145                 150                 155                 160

Ala Leu Asn Tyr Ala Val Arg Lys Leu Ser Asp Glu Cys Tyr Lys Asp
                165                 170                 175

Asn Phe Thr Ile Val Leu Leu His Pro Gly Phe Val Lys Thr Asp Met
            180                 185                 190

Gly Gln Ser Ala Ile Gln Lys Met Ser Asn Gly Asn Ala Glu Leu Leu
        195                 200                 205

Ala Tyr Ile Asp Ser Leu Thr Ile Asp Val Pro Thr Ser Ala Gly Gln
210                 215                 220

Ile Val Gly Ala Ile Met Thr Leu Asp Lys Gln Ser Ser Gly Arg Phe
225                 230                 235                 240

Ile Asn Ala Ala Asp Gln Phe Asp Leu Pro Phe
                245                 250
```

<210> SEQ ID NO 18
<211> LENGTH: 251
<212> TYPE: PRT
<213> ORGANISM: Ogataea minuta var nonfermentans

<400> SEQUENCE: 18

```
Met Ala Lys Thr Val Tyr Phe Ile Ala Gly Ala Ser Arg Gly Ile Gly
1               5                   10                  15

Leu Glu Val Ala Ser Gln Leu Ser Ala Asn Pro Asp Asn Tyr Val Ile
            20                  25                  30

Ala Ser Tyr Arg Ser Glu Lys Ser Ala Ser Gly Leu Leu Glu Leu Ala
        35                  40                  45

Lys Lys Asp Asn Val Asp Thr Ile Val Leu Asp Ile Ala Ser Gln Glu
50                  55                  60

Ser Ile Asp Ala Val Pro Ala Gln Ile Ser Lys Leu Thr Asp Gly Ile
65                  70                  75                  80

Asp Val Ala Leu Ile Asn Ala Gly Ile Ala Asn Ala Met Cys Pro Ile
                85                  90                  95

Leu Glu Cys Ser Arg Glu Ser Tyr Thr Asp His Trp Thr Thr Asn Ala
            100                 105                 110
```

```
Leu Gly Pro Ile Met Leu Tyr Gln Ala Ile His Lys Phe Met Leu Gln
        115                 120                 125

Arg Glu Thr Arg Lys Val Phe Phe Thr Thr Ser Ala Gly Gly Ser Ile
130                 135                 140

Gln Ala Lys Ile Pro Val Pro Val Ser Gly Tyr Gly Val Ser Lys Ala
145                 150                 155                 160

Ala Leu Asn Tyr Ala Ala Arg Lys Leu Ala Asp Glu Cys Tyr Lys Asp
                165                 170                 175

Asn Phe Thr Ile Val Leu Leu His Pro Gly Phe Val Lys Thr Asp Met
                180                 185                 190

Gly Gln Ser Ala Ile Gln Lys Met Ser Asn Gly Asn Ala Glu Leu Leu
        195                 200                 205

Ala Tyr Ile Asp Ser Leu Thr Ile Asp Val Pro Thr Ser Ala Gly Gln
        210                 215                 220

Ile Val Gly Ala Ile Met Thr Leu Asp Lys Gln Ser Ser Gly Arg Phe
225                 230                 235                 240

Ile Asn Ala Ala Asp Gln Phe Asp Leu Pro Phe
                245                 250

<210> SEQ ID NO 19
<211> LENGTH: 251
<212> TYPE: PRT
<213> ORGANISM: Ogataea minuta var nonfermentans

<400> SEQUENCE: 19

Met Ala Lys Thr Val Tyr Phe Ile Ala Gly Ala Ser Arg Gly Ile Gly
1               5                   10                  15

Leu Glu Val Ala Ser Gln Leu Ser Ala Asn Pro Asp Asn Tyr Val Ile
            20                  25                  30

Ala Ser Tyr Arg Ser Glu Lys Ser Ala Ser Gly Leu Leu Glu Leu Ala
        35                  40                  45

Lys Lys Asp Asn Val Asp Thr Ile Val Leu Asp Ile Ala Ser Gln Glu
50                  55                  60

Ser Ile Asp Ala Val Pro Ala Gln Ile Ser Lys Leu Thr Asp Gly Ile
65                  70                  75                  80

Asp Val Ala Leu Ile Asn Ala Gly Ile Ala Asn Ala Met Cys Pro Ile
                85                  90                  95

Leu Glu Cys Ser Arg Glu Ser Tyr Thr Asp His Trp Thr Thr Asn Ala
            100                 105                 110

Leu Gly Pro Ile Met Leu Tyr Gln Ala Ile His Lys Phe Met Leu Gln
        115                 120                 125

Arg Glu Thr Arg Lys Val Phe Phe Thr Thr Ser Ala Gly Gly Ser Ile
130                 135                 140

Gln Ala Lys Ile Pro Val Pro Val Ser Gly Tyr Gly Val Ser Lys Ala
145                 150                 155                 160

Ala Leu Asn Tyr Ala Val Arg Lys Leu Ser Asp Glu Cys Tyr Lys Asp
                165                 170                 175

Asn Phe Thr Ile Val Leu Leu His Pro Gly Phe Val Lys Thr Asp Met
                180                 185                 190

Gly Gln Ser Ala Ile Gln Lys Met Ser Asn Gly Asn Ala Glu Leu Leu
        195                 200                 205

Ala Tyr Ile Asp Ser Leu Thr Ile Asp Val Pro Thr Ser Ala Gly Gln
        210                 215                 220

Ile Val Gly Ala Ile Met Thr Leu Asp Lys Gln Ser Ser Gly Arg Phe
```

```
                    225                 230                 235                 240

Ile Asn Ala Ala Asp Gln Phe Asp Leu Pro Phe
                245                 250

<210> SEQ ID NO 20
<211> LENGTH: 251
<212> TYPE: PRT
<213> ORGANISM: Ogataea minuta var nonfermentans

<400> SEQUENCE: 20

Met Ala Lys Thr Val Tyr Phe Ile Ala Gly Ala Ser Arg Gly Ile Gly
1               5                   10                  15

Leu Glu Val Ala Ser Gln Leu Ser Ala Asn Pro Asp Asn Tyr Val Ile
                20                  25                  30

Ala Ser Tyr Arg Ser Glu Lys Ser Ala Ser Gly Leu Leu Glu Leu Ala
            35                  40                  45

Lys Lys Asp Asn Val Asp Thr Ile Val Leu Asp Ile Ala Ser Gln Glu
50                  55                  60

Ser Ile Asp Ala Val Pro Ala Gln Ile Ser Lys Leu Thr Asp Gly Ile
65                  70                  75                  80

Asp Val Ala Leu Ile Asn Ala Gly Ile Ala Asn Ala Met Cys Pro Ile
                85                  90                  95

Leu Glu Cys Ser Arg Glu Ser Tyr Thr Asp His Trp Thr Thr Asn Ala
            100                 105                 110

Leu Gly Pro Ile Met Leu Tyr Gln Ala Ile His Lys Phe Met Leu Gln
        115                 120                 125

Arg Glu Thr Arg Lys Val Phe Phe Thr Thr Ser Ala Gly Gly Ser Ile
130                 135                 140

Gln Ala Lys Ile Pro Val Pro Val Ser Gly Tyr Gly Met Ser Lys Ala
145                 150                 155                 160

Ala Leu Asn Tyr Ala Ala Arg Lys Leu Ser Asp Glu Cys Tyr Lys Asp
                165                 170                 175

Asn Phe Thr Ile Val Leu Leu His Pro Gly Phe Val Lys Thr Asp Met
            180                 185                 190

Gly Gln Ser Ala Ile Gln Lys Met Ser Asn Gly Asn Ala Glu Leu Leu
        195                 200                 205

Ala Tyr Ile Asp Ser Leu Thr Ile Asp Val Pro Thr Ser Ala Gly Gln
    210                 215                 220

Ile Val Gly Ala Ile Met Thr Leu Asp Lys Gln Ser Ser Gly Arg Phe
225                 230                 235                 240

Ile Asn Ala Ala Asp Gln Phe Asp Leu Pro Phe
                245                 250

<210> SEQ ID NO 21
<211> LENGTH: 251
<212> TYPE: PRT
<213> ORGANISM: Ogataea minuta var nonfermentans

<400> SEQUENCE: 21

Met Ala Lys Thr Val Tyr Phe Ile Ala Gly Ala Ser Arg Gly Ile Gly
1               5                   10                  15

Leu Glu Val Ala Ser Gln Leu Ser Ala Asn Pro Asp Asn Tyr Val Ile
                20                  25                  30

Ala Ser Tyr Arg Ser Glu Lys Ser Ala Ser Gly Leu Leu Glu Leu Ala
            35                  40                  45

Lys Lys Asp Asn Val Val Thr Ile Val Leu Asp Ile Ala Ser Gln Glu
```

```
           50                 55                  60
Ser Ile Asp Ala Val Pro Ala Gln Ile Ser Lys Leu Thr Asp Gly Ile
 65                  70                  75                  80

Asp Val Ala Leu Ile Asn Ala Gly Ile Ala Asn Ala Met Cys Pro Ile
                 85                  90                  95

Leu Glu Cys Ser Arg Glu Ser Tyr Thr Asp His Trp Thr Thr Asn Ala
            100                 105                 110

Leu Gly Pro Ile Met Leu Tyr Gln Ala Ile His Lys Phe Met Leu Gln
            115                 120                 125

Arg Glu Thr Arg Lys Val Phe Phe Thr Thr Ser Ala Gly Gly Ser Ile
            130                 135                 140

Gln Ala Lys Ile Pro Val Pro Val Ser Gly Tyr Gly Val Ser Lys Ala
145                 150                 155                 160

Ala Leu Asn Tyr Ala Val Arg Lys Leu Ser Asp Glu Cys Tyr Lys Asp
                165                 170                 175

Asn Phe Thr Ile Val Leu Leu His Pro Gly Phe Val Lys Thr Asp Met
            180                 185                 190

Gly Gln Ser Ala Ile Gln Lys Met Ser Asn Gly Asn Ala Glu Leu Leu
            195                 200                 205

Ala Tyr Ile Asp Ser Leu Thr Ile Asp Val Pro Thr Ser Ala Gly Gln
            210                 215                 220

Ile Val Gly Ala Ile Met Thr Leu Asp Lys Gln Ser Ser Gly Arg Phe
225                 230                 235                 240

Ile Asn Ala Ala Asp Gln Phe Asp Leu Pro Phe
                245                 250
```

<210> SEQ ID NO 22
<211> LENGTH: 251
<212> TYPE: PRT
<213> ORGANISM: Ogataea minuta var nonfermentans

<400> SEQUENCE: 22

```
Met Ala Lys Thr Val Tyr Phe Ile Ala Gly Ala Ser Arg Gly Ile Gly
 1               5                  10                  15

Leu Glu Val Ala Ser Gln Leu Ser Ala Asn Pro Asp Asn Tyr Val Ile
                 20                  25                  30

Ala Ser Tyr Arg Ser Glu Lys Ser Ala Ser Gly Leu Leu Glu Leu Ala
             35                  40                  45

Lys Lys Asp Asn Val Asp Thr Ile Val Leu Asp Ile Ala Ser Gln Glu
 50                  55                  60

Ser Ile Asp Ala Val Pro Ala Gln Ile Ser Lys Leu Thr Asp Gly Ile
 65                  70                  75                  80

Asp Val Ala Leu Ile Asn Ala Gly Ile Ala Asn Ala Met Cys Pro Ile
                 85                  90                  95

Leu Glu Cys Ser Arg Glu Ser Tyr Thr Asp His Trp Thr Thr Asn Ala
            100                 105                 110

Leu Gly Pro Ile Met Leu Tyr Gln Ala Ile His Lys Phe Met Leu Gln
            115                 120                 125

Arg Glu Thr Arg Lys Val Phe Phe Thr Thr Ser Ala Gly Gly Ser Ile
            130                 135                 140

Gln Ala Lys Ile Pro Val Pro Val Ser Gly Tyr Gly Val Ser Lys Ala
145                 150                 155                 160

Ala Leu Asn Tyr Ala Ala Arg Lys Leu Ser Asp Glu Cys Tyr Lys Asp
                165                 170                 175
```

```
Asn Phe Thr Ile Val Leu Leu His Pro Gly Phe Val Lys Thr Asp Met
            180                 185                 190
Gly Gln Ser Ala Ile Gln Lys Met Ser Asn Gly Asn Ala Glu Leu Leu
        195                 200                 205
Ala Tyr Ile Asp Ser Leu Thr Ile Asp Val Pro Thr Ser Ala Gly Gln
        210                 215                 220
Ile Val Gly Ala Ile Met Thr Leu Asp Lys Gln Ser Ser Gly Arg Phe
225                 230                 235                 240
Ile Asn Ala Ala Asp Gln Phe Asp Leu Pro Phe
                245                 250
```